(12) United States Patent
Suzuki et al.

(10) Patent No.: US 9,412,149 B2
(45) Date of Patent: Aug. 9, 2016

(54) DISPLAY DEVICE, COMPUTER PROGRAM, AND COMPUTER-IMPLEMENTED METHOD

(71) Applicant: PANASONIC INTELLECTUAL PROPERTY MANAGEMENT CO., LTD., Osaka (JP)

(72) Inventors: Akihiro Suzuki, Kanagawa (JP); Ryoji Ogino, Fukuoka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 14/564,713

(22) Filed: Dec. 9, 2014

(65) Prior Publication Data

US 2015/0091939 A1    Apr. 2, 2015

Related U.S. Application Data

(63) Continuation of application No. 13/980,422, filed as application No. PCT/JP2012/000366 on Jan. 23, 2012.

(30) Foreign Application Priority Data

Feb. 10, 2011    (JP) .................................. 2011-026766

(51) Int. Cl.
    *H04N 5/262*    (2006.01)
    *H04N 5/232*    (2006.01)
    *G06T 3/00*    (2006.01)
    *G09G 5/37*    (2006.01)
    *G06F 3/041*    (2006.01)

(52) U.S. Cl.
    CPC .............. *G06T 3/0018* (2013.01); *G06F 3/041* (2013.01); *G09G 5/37* (2013.01); *H04N 5/23238* (2013.01); *H04N 5/23293* (2013.01); *H04N 5/2628* (2013.01); *G06T 2207/20021* (2013.01); *G06T 2207/20112* (2013.01); *H04N 5/23235* (2013.01)

(58) Field of Classification Search
    CPC ...................................................... H04N 5/2628
    See application file for complete search history.

(56) References Cited

U.S. PATENT DOCUMENTS 3,953,111 A   4/1976  Fisher et al.
4,936,666 A   6/1990  Futhey
(Continued)

FOREIGN PATENT DOCUMENTS

CN    101442618       5/2009
EP    0695085 A1      1/1996
(Continued)

OTHER PUBLICATIONS

Video of ImmerVision Enables 360-degree Phanomorph Lens from ImmerVision-Installation Video available at https://www.youtube.com/watch?v=sR4CIyY4WMk, uploaded Aug. 5, 2009, and YouTube printout.

(Continued)

*Primary Examiner* — Mikhail Itskovich
(74) *Attorney, Agent, or Firm* — Greenblum & Bernstein, P.L.C.

(57) ABSTRACT

A method of processing an image includes receiving an omnidirectional image. An instruction is received with a processor to process the omnidirectional image to generate a rectangular image, in response to user input via a display on the omnidirectional image. At least one intermediate image is generated showing a transition between the omnidirectional image and the rectangular image.

39 Claims, 21 Drawing Sheets

(56) References Cited

U.S. PATENT DOCUMENTS

| | | | |
|---|---|---|---|
| 5,185,667 | A | 2/1993 | Zimmermann |
| 5,508,734 | A | 4/1996 | Baker et al. |
| 5,686,957 | A | 11/1997 | Baker |
| 6,031,670 | A | 2/2000 | Inoue |
| 6,128,145 | A | 10/2000 | Nagaoka |
| 6,574,376 | B1 | 6/2003 | Shiota et al. |
| 6,795,109 | B2 | 9/2004 | Peleg et al. |
| 6,844,990 | B2 | 1/2005 | Artonne et al. |
| 7,593,041 | B2 | 9/2009 | Novak |
| 8,326,077 | B2 | 12/2012 | Chai et al. |
| 8,639,045 | B2 | 1/2014 | Yokomitsu et al. |
| 2003/0180039 | A1 | 9/2003 | Kakou et al. |
| 2004/0100565 | A1 | 5/2004 | Chen et al. |
| 2004/0136092 | A1 | 7/2004 | Artonne et al. |
| 2007/0030353 | A1 | 2/2007 | Novak |
| 2009/0010567 | A1 | 1/2009 | Akiba et al. |
| 2009/0100767 | A1* | 4/2009 | Kondo et al. ............... 52/6 |
| 2010/0302347 | A1 | 12/2010 | Shikata |
| 2011/0018964 | A1 | 1/2011 | Krishnan et al. |
| 2011/0316884 | A1 | 12/2011 | Giambalvo et al. |
| 2012/0155769 | A1 | 6/2012 | Yokomitsu et al. |
| 2012/0206607 | A1 | 8/2012 | Morioka |
| 2012/0236024 | A1 | 9/2012 | Fujii et al. |
| 2012/0242788 | A1 | 9/2012 | Chuang et al. |
| 2013/0002712 | A1 | 1/2013 | Fujii et al. |
| 2013/0057546 | A1 | 3/2013 | Watanabe et al. |
| 2013/0293672 | A1 | 11/2013 | Suzuki et al. |

FOREIGN PATENT DOCUMENTS

| | | |
|---|---|---|
| EP | 0695085 B1 | 2/2000 |
| EP | 1028389 A2 | 8/2000 |
| EP | 1386480 B1 | 7/2011 |
| JP | 06-501585 | 2/1994 |
| JP | 11-136584 | 5/1999 |
| JP | 11-261868 A | 9/1999 |
| JP | 2000-221391 | 8/2000 |
| JP | 2000-242773 A | 9/2000 |
| JP | 2001-333422 A | 11/2001 |
| JP | 2002-152722 | 5/2002 |
| JP | 2002-344962 | 11/2002 |
| JP | 2003-250070 | 9/2003 |
| JP | 2008-061172 | 3/2008 |
| JP | 2008-301034 | 12/2008 |
| JP | 2009-17007 | 1/2009 |
| JP | 4516665 B2 | 8/2010 |
| JP | 2010-219872 A | 9/2010 |
| JP | 2010-239221 A | 10/2010 |
| JP | 2010-278587 | 12/2010 |
| JP | 2011-4220 | 1/2011 |
| JP | 5268743 B2 | 8/2013 |
| WO | 02/093908 A2 | 11/2002 |

OTHER PUBLICATIONS

Video of ImmerVision Enables 360° Surveillance Video with Panomorph Player—City Intersection, Video available at https://www.youtube.com/watch?v=Rf9fe091dm8, uploaded Jun. 16, 2011, and YouTube printout.
Video of ImmerVision Enables 360° Surveillance Video with Panomorph Player—Exterior Building, Video available at https://www.youtube.com/watch?v=aU3Qd4TadM8, uploaded Jun. 16, 2011, and YouTube printout.
International Search Report, mail date is Feb. 14, 2012.
Shah, S., et al., "A Simple Calibration Procedure for Fish-Eye (High Distortion) Lens Camera", IEEE Intl. Conference on Robotics and Automation, vol. 4, 1994, pp. 3422-3427.
Shah, S., et al., Intrinsic Parameter Calibration Procedure for a (High-Distortion) Fish-Eye Lens Camera with Distortion Model and Accuracy Estimation, vol. 29, No. 11, pp. 1775-1788 (1996).
Miyamoto, K., "Fish Eye Lens", Institute of Plasma Physics, Nagoya University, Nagoya, Japan, 1964, pp. 1060-1061.
Hughes, C. et al., "Accuracy of fish-eye lens models", Applied Optics, vol. 49, No. 17, Jun. 10, 2010, pp. 3338-3347.
Herbert, T., Calibration of fisheye lenses by inversion of area projections, Applied Optics vol. 25, No. 12, Jun. 15, 1986, pp. 1875-1876.
Hecht, E., "Optics", Addison-Wesley Publishing Company, $2^{nd}$ Ed. 1990, pp. 128-132.
Miyamoto, K., "The Phase Fresnel Lens", Journal of the Optical Society of America, vol. 51, No. 1, Jan. 1961, pp. 17-20.
Boulianne, M. et al., "Hemispherical Photographs Used for Mapping Confined Spaces", PE&RS, Sep. 1997, vol. 63, No. 9, pp. 1103-1109.
Herbert, T., "Area Projections of Fisheye Photographic Lenses", Agricultural and Forest Meterology, 39 (1987), pp. 215-223.
Richards, J., "Remote Sensing Digital Image Analysis, An Introduction", Springer-Verlag, 1986, pp. 41-43, 50-54, 69-75, 78.
Panasonic WV-SF438, 360-degree Super Dynamic Dome Network Camera, undated.
Panasonic WV-SW458, WV-SW458M, 360-degree Super Dynamic Vandal Resistant Dome Network Camera, undated.
Fujinon Fujifilm Megapixel Vari Focal Lenses, Aug. 2010.
Office Action in U.S. Appl. No. 13/980,422 dated Oct. 21, 2015.
Office Action and Search Report in related Chinese Application 201280008473.5, with English language translation of search report, dated Jan. 20, 2016.
Office Action in related Japanese Application 2014-250956, dated Oct. 20, 2015.

* cited by examiner

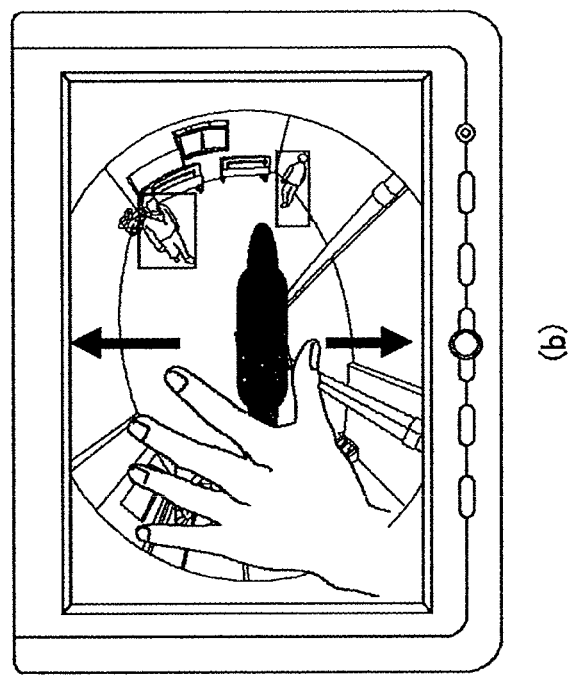
(b)
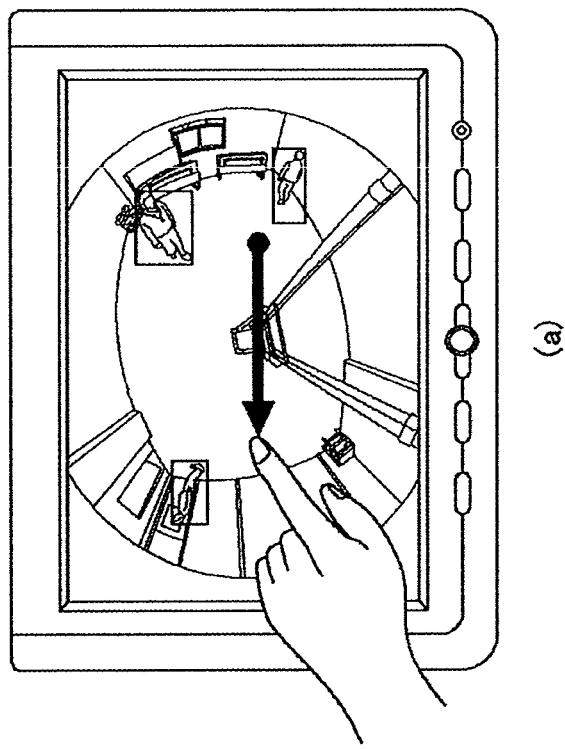
(a)
Fig.16

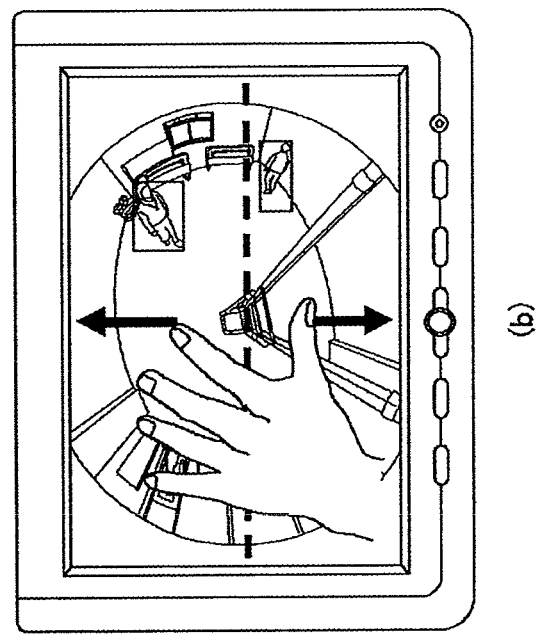
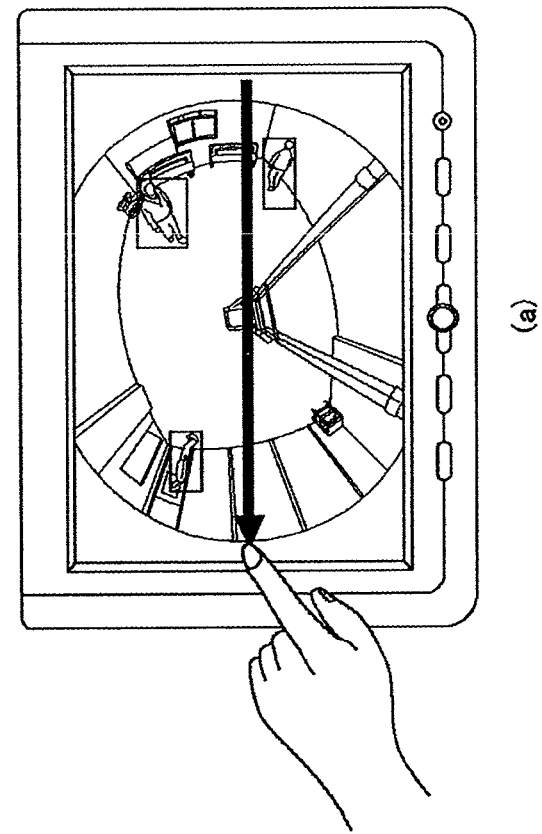
Fig.17

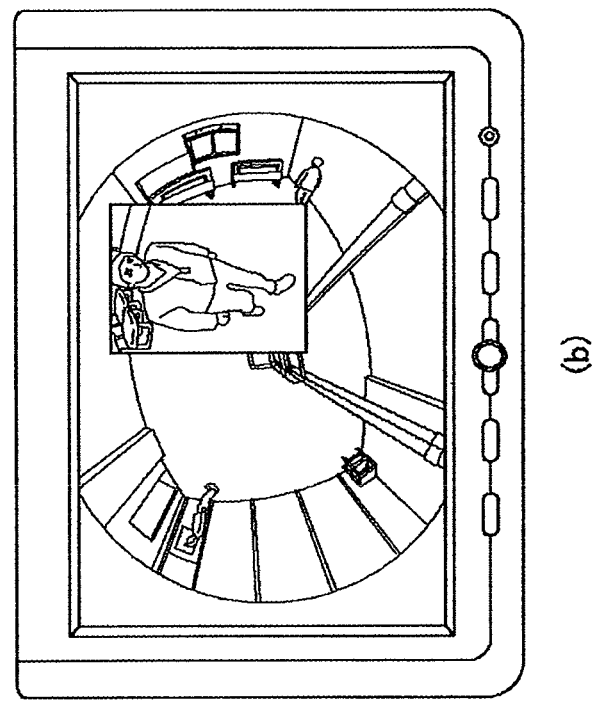
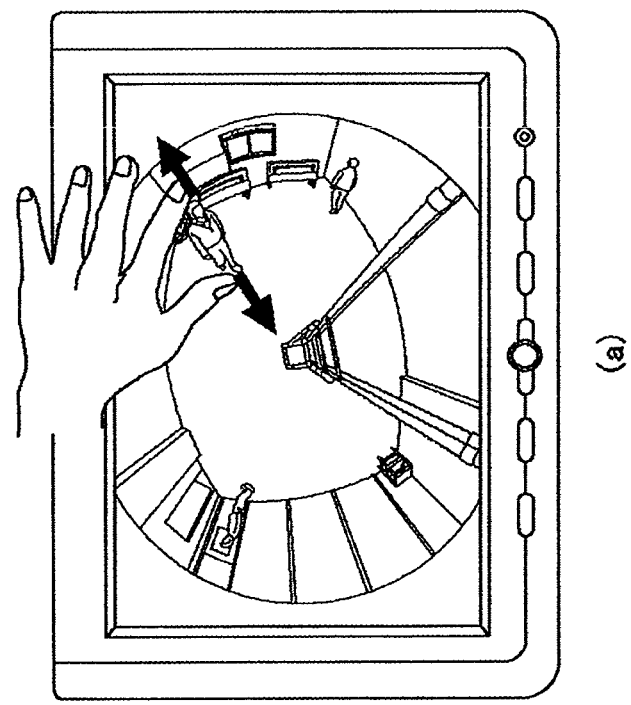
Fig. 18

DISPLAY DEVICE, COMPUTER PROGRAM, AND COMPUTER-IMPLEMENTED METHOD

CROSS-REFERENCE TO RELATED APPLICATIONS

This application is a continuation of co-pending U.S. application Ser. No. 13/980,422, filed Jul. 18, 2013, which is the U.S. National Stage of International Application No. PCT/JP2012/000366, filed Jan. 23, 2012, which claims priority to Japanese Application No. 2011-026766, filed Feb. 10, 2011. The contents of which are expressly incorporated herein by reference in their entireties.

TECHNICAL FIELD

The present invention relates to a display device which displays video images and, more particularly, relates to a display device which displays video images captured by an omnidirectional camera.

BACKGROUND ART

Conventionally, a display device which displays a video image of an omnidirectional camera on a monitor is known. The omnidirectional camera generates a video image using a fish-eye lens having 360 degrees of a horizontal field of view, and therefore this video image (referred to as an "omnidirectional image" below) has a circular shape or a donut shape and has characteristics that distortion becomes significant at a position closer to an outer periphery. Hence, a conventional display device can display not only display an omnidirectional image which allows an entire image capturing range to be checked but also display an image (referred to as a "distortion corrected image" below) obtained by correcting distortion of a clipping range of entirety or part of the omnidirectional image. Further, this switching of display is based on a user's instruction.

Meanwhile, a display device which displays a video image of an omnidirectional camera is used in, for example, the following scenes. In a business scene, a mobile terminal such as a mobile telephone is used as a display device to display a video image of an omnidirectional camera installed at a construction site, a facility or a store. Further, when an omnidirectional camera is used as a monitoring camera, the omnidirectional camera is installed at a monitoring target site such as a railway platform or a parking lot, a video image of the omnidirectional camera is displayed at a headquarter or a central control room and is monitored by security guards. Furthermore, when a worker installs an omnidirectional camera which is used as a monitoring camera, at a high place such as a telegraph pole, an installation work business operator adjusts an angle of view while checking a video image of the omnidirectional camera using a display device of a wearable display type such as a wrist watch type.

When the display device is realized by a personal computer which has a monitor, an operation inputting means such as a mouse and a keyboard is provided, so that a user can instruct switching display by operating this operation inputting means (see, for example, Patent Literature 1 and Patent Literature 2).

CITATION LIST

Patent Literature

Patent Literature 1: Japanese Patent Application Laid-Open No. 11-136584
Patent Literature 2: Japanese Patent Application Laid-Open No. 2008-301034

SUMMARY OF INVENTION

Technical Problem

However, when a small mobile terminal such as a mobile telephone is used as a display device as described above, the operation inputting means is physically restricted and an operation inputting means such as a mouse or a keyboard cannot be adopted unlike a conventional display device. In case of the display device which a worker who works at a high place wears as described above, the display device is made smaller and restrictions on the operation inputting means become more severe.

Further, even when physical restrictions are comparatively less like a display device installed at the above described headquarter or central control room, it is desirable to switch between display of an omnidirectional image and display of a distortion corrected image by a more intuitive operation without performing a complicated operation.

In light of the above problem, an object of the present invention is to provide a display device which can switch between display of an omnidirectional image and display of a distortion corrected image by a simple operation through an intuitive user interface.

Solution to Problem

In order to solve the conventional problem, a display device according to the present invention employs a configuration which includes: an image acquiring unit which acquires an omnidirectional image or a distortion corrected image obtained by correcting distortion of the omnidirectional image; a touch panel display unit which includes a panel interface; an operation detecting unit which, when the omnidirectional image or the distortion corrected image is displayed on the display unit, detects an operation which is directly performed with respect to a displayed image using the panel interface and which is directed to switching between display of the omnidirectional image and display of the distortion corrected image; and a display control unit which has the display unit displays the omnidirectional image or the distortion corrected image, and switches between the display of the omnidirectional image and the display of the distortion corrected image according to the operation detected by the operation detecting unit.

Another aspect of the present invention is a computer program, and this computer program is executed by a display device which has a touch panel display unit to cause the display device to function as the above display device.

Still another aspect of the present invention is a computer-implemented method in a device which has a touch panel display unit which includes a panel interface, and this method includes: a step of, when the omnidirectional image or the distortion corrected image is displayed on the display unit, detecting an operation which is directly performed with respect to a displayed image using the panel interface and which is directed to switching between display of the omnidirectional image and display of the distortion corrected image; and a step of switching between the display of the omnidirectional image and the display of the distortion corrected image according to the detected operation.

Advantageous Effects of Invention

The present invention enables a direct input of an operation of, when an omnidirectional image or a distortion corrected image is displayed on a touch panel display unit, switching display of the displayed image, so that it is possible to intuitively switch between display of an omnidirectional image and display of a distortion corrected image by a simple operation.

As described below, the present invention involves other aspects. Hence, disclosure of the present invention is intended to provide parts of the present invention and by no means limits the scope of the invention claimed herein.

BRIEF DESCRIPTION OF DRAWINGS

FIG. 16(a) is a view illustrating a dragging operation of panoramic expansion according to a third modified example of the embodiment of the present invention.

FIG. 16(b) is a view illustrating a pinching out operation of panoramic expansion according to the third modified example of the embodiment of the present invention.

FIG. 17(a) is a view illustrating a dragging operation of double panoramic expansion according to a fourth modified example of the embodiment of the present invention.

FIG. 17(b) is a view illustrating a pinching out operation of double panoramic expansion according to the fourth modified example of the embodiment of the present invention.

FIG. 18(a) is a view illustrating a pinching out operation (radial direction) of switching display of an omnidirectional image according to a fifth modified example of the embodiment of the present invention.

FIG. 18(b) is a view illustrating a multi image including a clipped image according to the fifth modified example of the embodiment of the present invention.

DESCRIPTION OF EMBODIMENTS

Figure 1:
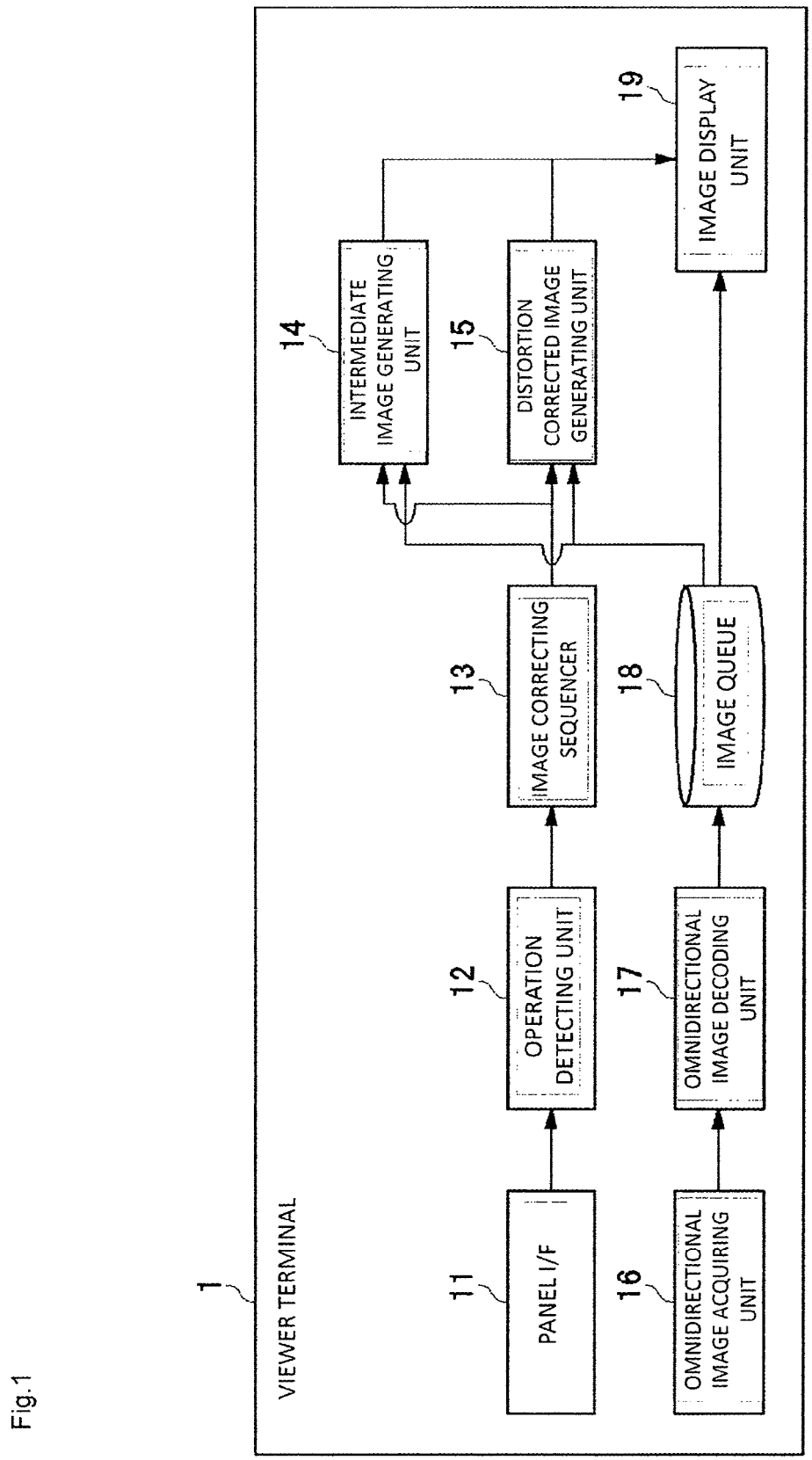
FIG. 1 is a block diagram illustrating a configuration of a viewer terminal according to an embodiment of the present invention.

Hereinafter, details of the present invention will be described. An embodiment described below is only an example of the present invention, and the present invention can be deformed in various modes. Hence, specific configurations and functions disclosed below by no means limit the claims.

A display device according to the embodiment of the present invention employs a configuration which includes: an image acquiring unit which acquires an omnidirectional image or a distortion corrected image obtained by correcting distortion of the omnidirectional image; a touch panel display unit which includes a panel interface; an operation detecting unit which, when the omnidirectional image or the distortion corrected image is displayed on the display unit, detects an operation which is directly performed with respect to a displayed image using the panel interface and which is directed to switching between display of the omnidirectional image and display of the distortion corrected image; and a display control unit which has the display unit displays the omnidirectional image or the distortion corrected image, and switches between the display of the omnidirectional image and the display of the distortion corrected image according to the operation detected by the operation detecting unit.

According to this configuration, a user can directly input an operation of, when an omnidirectional image or a distortion corrected image is displayed on a touch panel display unit, switching display of the displayed image, and, consequently, intuitively switch between display of an omnidirectional image and display of a distortion corrected image by a simple operation. In addition, the display device may further have a distortion corrected image generating unit which corrects distortion of part or entirety of the omnidirectional image, and generates a distortion corrected image.

In the above display device, when the omnidirectional image is displayed on the display unit and when the operation detecting unit detects that the omnidirectional image displayed on the display unit is pinched out, the display control unit may switch the display of the omnidirectional image to the display of the corrected image.

According to this configuration, pinching out of the omnidirectional image performed by the user and switching of display that the omnidirectional image is expanded and a distortion corrected image is displayed intuitively match, so that the user can more intuitively switch the display.

In the above display device, when the distortion corrected image is displayed on the display unit and when the operation detecting unit detects that the distortion corrected image displayed on the display unit is pinched in, the display control unit may switch the display of the distortion corrected image to the display of the omnidirectional image.

According to this configuration, pinching in of the distortion corrected image performed by the user and switching of display that the distortion corrected image is reversed to the omnidirectional image intuitively match, so that the user can more intuitively switch the display.

In the above display device, the distortion corrected image is a panoramic image obtained by performing panoramic expansion of the omnidirectional image based on a pinched out portion as a base line.

According to this configuration, pinching out performed by the user and switching of display of the omnidirectional image to display of a panoramic image intuitively match, so that the user can intuitively perform an operation of switching the display of the omnidirectional image to the display of the panoramic image by a simple operation.

In the above display device, the distortion corrected image may be a clipped image obtained by enlarging a pinched out portion.

According to this configuration, pinching out and display of the enlarged clipped image intuitively match, so that the user can intuitively perform an operation of displaying the clipped image by a simple operation.

In the display device, when the omnidirectional image is displayed on the display unit and when the operation detecting unit detects that the omnidirectional image displayed on the display unit is tapped, the display control unit has the display unit displays the distortion corrected image of a tapped portion of the omnidirectional image.

According to this configuration, tapping of the omnidirectional image performed by the user and display of the distortion corrected image of the tapped portion intuitively match, so that the user can intuitively perform an operation of displaying the distortion corrected image by a simple operation.

In the above display device, the display control unit may determine a correction parameter of an image based on the operation detected by the operation detecting unit, the display device may further have an intermediate image generating unit which generates an intermediate image displayed during switching between the display of the omnidirectional image and the display of the distortion corrected image, according to the correction parameter determined by the display control unit, and the display control unit may have the display unit displays the intermediate image generated by the intermediate image generating unit during the switching between the display of the omnidirectional image and the display of the distortion corrected image.

According to this configuration, the user can check switching process of display based on the intermediate image and, consequently, intuitively recognize the operation the user has performed and recognize the correlation between the display before switching and the display after switching.

A computer program according to the embodiment of the present invention is executed by a display device which has a touch panel display unit to cause the display device to function as the above display device.

A computer-implemented method according to the embodiment of the present invention is a computer-implemented method in a device which has a touch panel display unit which includes a panel interface, and includes: a step of, when the omnidirectional image or the distortion corrected image is displayed on the display unit, detecting an operation which is directly performed with respect to a displayed image using the panel interface and which is directed to switching between display of the omnidirectional image and display of the distortion corrected image; and a step of switching between the display of the omnidirectional image and the display of the distortion corrected image according to the detected operation.

According to this configuration, a user can directly input an operation of, when an omnidirectional image or a distortion corrected image is displayed on a touch panel display unit, switching display of the displayed image, and, consequently, intuitively switch between display of an omnidirectional image and display of a distortion corrected image by a simple operation.

In the above computer-implemented method, when the omnidirectional image is displayed on the display unit and when the omnidirectional image is pinched out, the display of the omnidirectional image may be switched to the display of the distortion corrected image.

According to this configuration, pinching out of the omnidirectional image performed by the user and switching of display that the omnidirectional image is expanded and a distortion corrected image is displayed intuitively match, so that the user can more intuitively switch the display.

In the above computer-implemented method, when the distortion corrected image is displayed on the display unit and when the distortion corrected image is pinched in, the display of the distortion corrected image may be switched to the display of the omnidirectional image.

According to this configuration, pinching in of the distortion corrected image performed by the user and switching of display that the distortion corrected image is reversed to the omnidirectional image intuitively match, so that the user can more intuitively switch the display.

In the above computer-implemented method, when the omnidirectional image is displayed on the display unit and when the omnidirectional image is tapped, the display unit may be caused to display the distortion corrected image of a tapped portion of the omnidirectional image.

According to this configuration, tapping of the omnidirectional image performed by the user and display of the distortion corrected image of the tapped portion intuitively match, so that the user can intuitively perform an operation of displaying the distortion corrected image by a simple operation.

Hereinafter, an embodiment for implementing the present invention will be described with reference to the drawings. FIG. 1 is a block diagram illustrating a configuration of a viewer terminal which is a display device according to an embodiment of the present invention. The viewer terminal 1 includes a panel interface 11, an operation detecting unit 12, an image correcting sequencer 13, an intermediate image generating unit 14, a distortion corrected image generating unit 15, an omnidirectional image acquiring unit 16, an omnidirectional image decoding unit 17, an image queue 18 and an image display unit 19. In addition, the image display unit 19 and the panel interface 11 are overlaid and provided to form a touch panel display unit.

The panel interface 11 receives an operation inputted by user's fingers, and outputs information of an operation position. The operation detecting unit 12 receives the information of the operation position from the panel interface 11 and, when a panel operation is changed, detects content of the panel operation performed by the user based on content of the change. Operations performed by the user's fingers with respect to the panel interface 11 include tapping, dragging, flicking, pinching (pinching out and pinching in) and rotation.

Tapping refers to an operation of lightly hitting a portion of the panel interface 11 by one finger, that is, an operation of touching the panel interface 11 by one finger and separating the finger from the panel interface 11 without moving the finger on the panel interface 11. Dragging refers to an operation of dragging the finger on the panel interface 11, that is, an operation of moving one fingertip in contact with the panel interface 11, stopping movement of the finger and separating the finger from the panel interface 11. Flicking refers to an operation of flipping the panel interface 11 by the finger, that is, an operation of moving one fingertip in contact with the panel interface 11 and separating the finger from the panel interface 11 without stopping movement of the finger.

Pinching out refers to an operation of moving one or both of two fingertips on the panel interface 11 keeping the two fingertips in contact with the panel interface 11 such that a distance between the fingers becomes far. By contrast with this, pinching in refers to an operation of moving one or both of the two fingertips on the panel interface 11 keeping the two fingertips in contact with the panel interface 11 such that a distance between the fingers becomes close. Rotation refers to an operation of moving one or both of the two fingertips on the panel interface 11 keeping the two fingertips in contact with the panel interface 11 such that a line segment connecting the fingers rotates in a plane of the panel interface 11.

In addition, operations performed by user's fingers may include, for example, double tapping and long tapping in addition to the above. Further, when an electronic compass is built in the viewer terminal 1 and can detect an acceleration (posture) of the viewer terminal 1, the user may input an operation by shaking or tilting the viewer terminal 1. In this case, when the acceleration of the viewer terminal 1 changes, the operation detecting unit 12 detects a user's operation based on content of this change.

The image sequencer 13 determines correction parameters (such as a center coordinate, a range, rotation and distortion) of an image to be generated and displayed next, according to content of a panel operation to have the image display unit 19 display the image and switch between display of an omnidirectional image, display of an intermediate image and display of a distortion corrected image (the distortion corrected image includes a panoramic image and a clipped image.). The correction parameters are parameters used to correct an omnidirectional image. By applying the correction parameters to an omnidirectional image, a distortion corrected image or an intermediate image is generated. The image correcting sequence 13 corresponds to the display control unit according to the present invention.

The intermediate image generating unit 14 generates an intermediate image upon switching from an omnidirectional image to a distortion corrected image or from a distortion corrected image to an omnidirectional image. The intermediate image is an image displayed during switching. The intermediate image generating unit 14 generates an intermediate image matching content of a panel operation based on the correction parameters inputted from the image correcting sequencer 13. The intermediate image generating unit 14 generates a plurality of intermediate images where necessary to show that switching from an omnidirectional image to a distortion corrected image or from a distortion corrected image to an omnidirectional image is performed stepwise.

The distortion corrected image generating unit 15 corrects distortion of an omnidirectional image based on the correction parameters inputted from the image correcting sequencer 13, and generates a distortion corrected image. The omnidirectional image acquiring unit 16 acquires an omnidirectional image captured by an imaging device (camera) using a fish-eye lens. This imaging device has a field of view including 360 degrees of a horizontal angle of view and 180 degrees of a vertical angle of view. The omnidirectional image is a circular or donut-shaped image, and distortion becomes more significant apart from the center. The imaging device is provided at a high place to an image capturing target place to shoot images downward. The omnidirectional image acquiring unit 16 acquires an omnidirectional image captured by the imaging device in a compressed image file format. The omnidirectional image acquiring unit 16 receives an image file of the omnidirectional image by way of, for example, wireless communication.

The omnidirectional image decoding unit 17 decodes the image file of the omnidirectional image acquired by the omnidirectional image acquiring unit 16, and expands the omnidirectional image. The image queue 18 temporarily stores the omnidirectional image expanded by the omnidirectional image decoding unit 17, and outputs the omnidirectional image to the image correcting sequencer 13 or the image display unit 19 where necessary. Using a monitor, the image display unit 19 displays the intermediate image generated by the intermediate image generating unit 14, the distortion corrected image generated by the distortion corrected image generating unit 15 and the omnidirectional image expanded by the omnidirectional image decoding unit 17. The image display unit 19 corresponds to a display unit according to the present invention.

Figure 2:
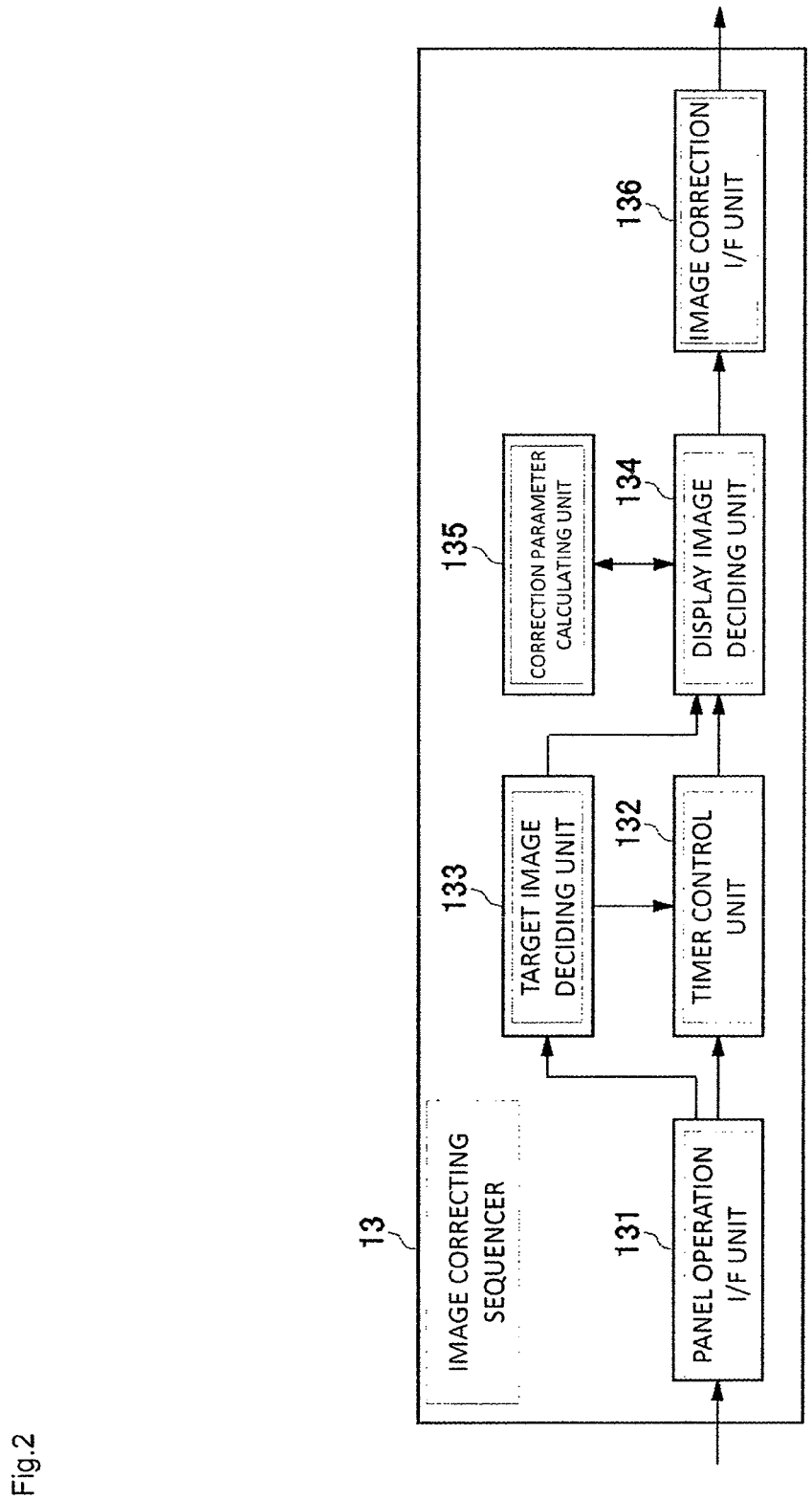
FIG. 2 is a block diagram illustrating a detail configuration of an image correcting sequencer according to the embodiment of the present invention.

FIG. 2 is a block diagram illustrating a detail configuration of the image correcting sequencer. As illustrated in FIG. 2, the image correcting sequencer 13 has a panel operation interface unit 131, a timer control unit 132, a target image deciding unit 133, a display image deciding unit 134, a correction parameter calculating unit 135 and an image correction interface unit 136.

When a panel operation is changed, the panel operation interface unit 131 acquires content of this change from the operation detecting unit 12. The timer control unit 132 controls a timer for a display switching period until a final target image is displayed. When display of an omnidirectional image is switched to display of a distortion corrected image, the distortion corrected image becomes a target image, and, when display of the distortion corrected image is switched to display of the omnidirectional image, the omnidirectional image becomes a target image. When the panel is operated, the timer control unit 132 sets a time out value according to specific content (an operation position and intensity) of this operation (tapping, dragging, flicking, pinching out, pinching in and rotation). Until time out occurs, an intermediate image is displayed and, after time out occurs, the target image is displayed.

The target image deciding unit 133 decides the target image based on content of a current panel operation. That is, when receiving an input of an operation of switching to display of a distortion corrected image while an omnidirectional image is displayed, the target image deciding unit 133 sets the distortion corrected image as a target image. In this case, the distortion corrected image includes a panoramic image and a clipped image, and therefore the target image deciding unit 133 also decides whether the target image is a panoramic image or a clipped image. Further, when receiving an input of an operation of switching to display of an omnidirectional image while a distortion corrected image is displayed, the target image deciding unit 133 sets the omnidirectional image as the target image.

The display image deciding unit 134 determines an image (an omnidirectional image, a distortion corrected image or an intermediate image) to be currently displayed according to timer control performed by the timer control unit 132. When the image to be displayed is an intermediate image, the correction parameter calculating unit 135 determines correction parameters of an intermediate image to be displayed next according to a history of operation inputs, content of a current operation input and a timer value. The correction parameters include parameters related to a center coordinate, rotation and distortion. The image correction interface unit 136 invokes image generation processing per display image determined by the display image deciding unit 134.

Switching of display performed using the viewer terminal 1 configured as described above will be described. Switching of display includes: (1) switching from omnidirectional image to panoramic image; (2) switching from panoramic image to omnidirectional image; (3) switching from omnidirectional image to multi image including clipped image; (4) switching from single panoramic image to double panoramic image; (5) switching from double panoramic image to single panoramic image; (6) scroll of panoramic image; (7) change of clipping range of clipped image; and (8) rotation of omnidirectional image. These will be described in order.

(1) Switching from Omnidirectional Image to Panoramic Image

Figure 3:
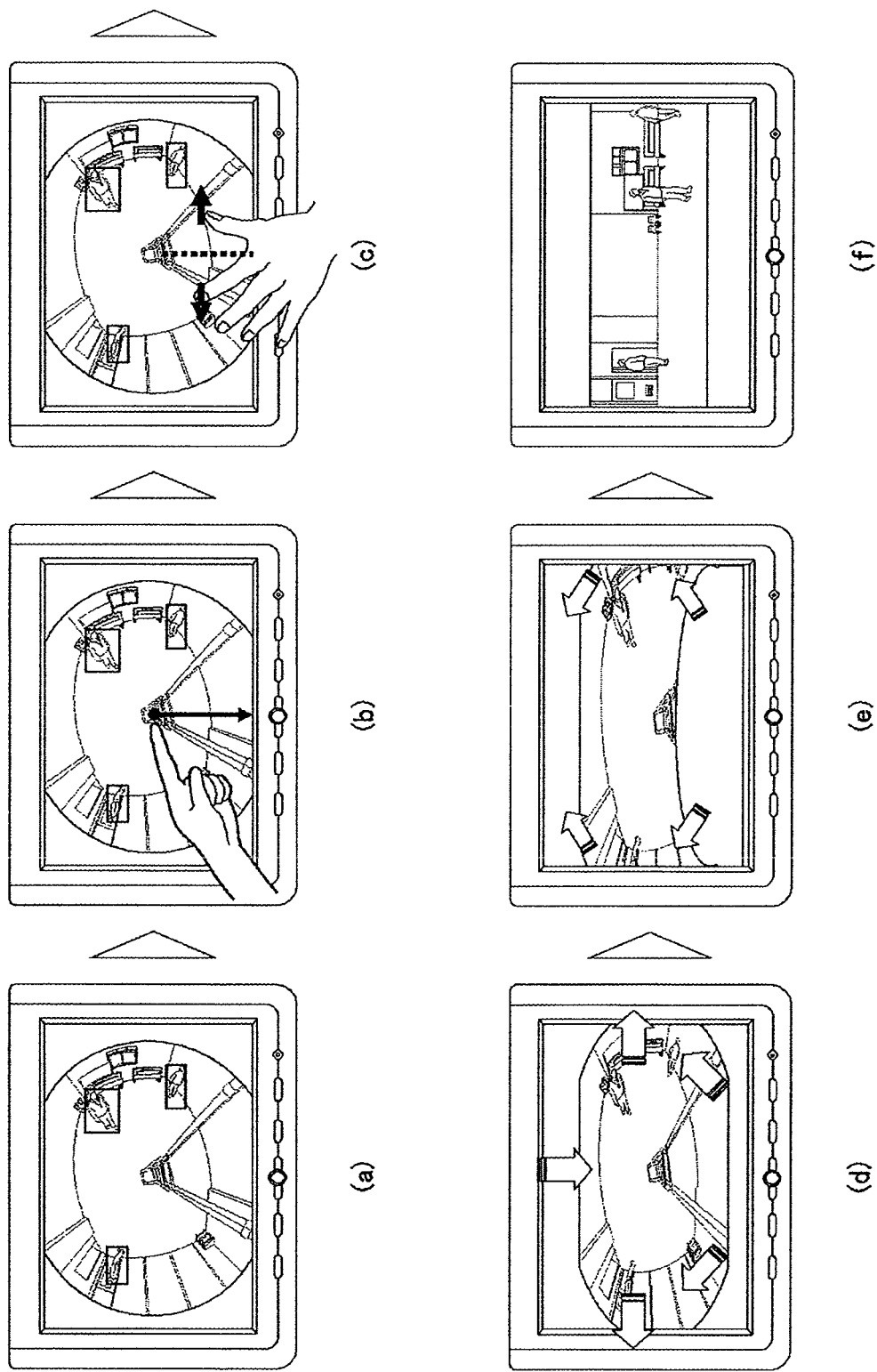
FIG. 3(a) is a view illustrating an omnidirectional image according to the embodiment of the present invention.
FIG. 3(b) is a view illustrating a dragging operation of specifying a base line upon switching from an omnidirectional image to a panoramic image according to the embodiment of the present invention.
FIG. 3(c) is a view illustrating a pinching out operation upon switching from an omnidirectional image to a panoramic image according to the embodiment of the present invention.
FIG. 3(d) is a view illustrating an intermediate image upon switching from an omnidirectional image to a panoramic image according to the embodiment of the present invention.
FIG. 3(e) is a view illustrating an intermediate image upon switching from an omnidirectional image to a panoramic image according to the embodiment of the present invention.
FIG. 3(f) is a view illustrating a panoramic image according to the embodiment of the present invention.

FIG. 3 is a view explaining switching from display of an omnidirectional image to display of a panoramic image. In addition, although, in the present embodiment, the display unit of the viewer terminal 1 has a rectangular shape displays an omnidirectional image which is originally circular with upper and lower portions cut, an image to be displayed in this way is also referred to as an "omnidirectional image". When an omnidirectional image is displayed as illustrated in FIG. 3(*a*), a user first selects a base line (expansion line) to expand the omnidirectional image to a panoramic image. To select the base line, the user drags the omnidirectional image from a center of the omnidirectional image in a circumferential direction as illustrated in FIG. 3(*b*). Next, as illustrated in FIG. 3(*c*), the user pinches out the image crossing a dragging line.

The operation detecting unit 12 detects a type (dragging and pinching out), the speed and the position of this operation to output to the image correcting sequencer 13. The operation panel interface unit 131 of the image correcting sequencer 13 receives an input of content and the position of this operation, and outputs the content and the position to the timer control unit 132 and the target image deciding unit 133.

Based on a currently displayed image (omnidirectional image) and the content and the position of the operation, the target image deciding unit 133 decides that this operation is directed to changing the omnidirectional image to a panoramic image, decides that the target image is a panoramic image and outputs the result to the display image deciding unit 134 and the timer control unit 132. The timer control unit 132 determines a time spent for a transition from the omnidirectional image to the panoramic image based on the speed at which two fingertips are separated upon pinching out, and starts a timer (that is, makes a transition time shorter when the speed at which fingertips are separated is faster).

When the timer value from the timer control unit 132 does not reach a time out value, the display image deciding unit 134 notifies to the image correction interface unit 136 that an image which needs to be displayed is an intermediate image to display the intermediate image according to the timer value, and outputs a time out value and a current timer value or a ratio of the current timer value with respect to the time out value to the correction parameter calculating unit 135.

The correction parameter calculating unit 135 generates correction parameters to generate the intermediate image according to the ratio of the current timer value with respect to the time out value, and outputs the correction parameters to the image correction interface unit 136. When the timer value reaches the time out value, the display image deciding unit 134 notifies to the image correction interface unit 136 that the image which needs to be displayed is a target image (that is, a panoramic image).

When notified by the display image deciding unit 134 that the image which needs to be displayed is the intermediate image, the image correction interface unit 136 invokes intermediate image generation processing of the intermediate image generating unit 14, and outputs the correction parameters calculated by the correction parameter calculating unit 135 to the intermediate image generating unit 14. The intermediate image generating unit 14 corrects the omnidirectional image using the correction parameters inputted from the correction parameter calculating unit 135, generates an intermediate image and outputs the intermediate image to the image display unit 19.

The timer control unit 132 outputs the timer value to the display image deciding unit 134 at a predetermined intermediate image frame rate, and the display image deciding unit 134 decides whether or not a timer value reaches a time out value in each case, notifies to the image correction interface unit 136 that the image which needs to be displayed is an intermediate image until the timer value reaches the time out value, and outputs the time out value and a current timer value, or a ratio of the current timer value with respect to the time out value to the correction parameter calculating unit 135. Further, the correction parameter calculating unit 135 calculates correction parameters for generating an intermediate image, and the intermediate image generating unit 14 generates an intermediate image using the correction parameters. By this means, until time out occurs, the intermediate image is generated at the above intermediate image frame rate.

FIGS. 3(*d*) and 3(*e*) illustrate the intermediate image generated as described above. The intermediate image is an image which is in process of a transition from a circular omnidirectional image to a rectangular panoramic image, and shows a transition that an up and down direction is crushed downward, a left and right direction is stretched outward and a slit is made in the base line to gradually delete a lower half.

When the display image deciding unit 134 decides that a timer value times out as a result that the timer control unit 132 outputs a timer value at an intermediate image frame rate, the image correction interface unit 136 notifies to the distortion corrected image generating unit 15 that an image which needs to be displayed is a target image (that is, a distortion corrected image) from the display image deciding unit 134. When receiving this notification, the distortion corrected image generating unit 15 corrects the omnidirectional image, and generates a panoramic image without distortion as illustrated in FIG. 3(*f*).

In addition, all directions of 360 degrees of the horizontal angle of view of the panoramic image may be displayed on the image display unit 19, and only part corresponding to a partial range of 360 degrees of the horizontal angle of view may be displayed. In the latter case, the panoramic image may be scrolled leftward and rightward by a scrolling operation.

In addition, although panoramic expansion is performed by drawing the base line from the center of the omnidirectional image in a vertical downward direction in the above example, panoramic expansion is not limited to this, and the base line may be drawn from the center of the omnidirectional image in an arbitrary circumferential direction. Also in this case, the intermediate image generating unit 14 and the distortion corrected image generating unit 15 expand the omnidirectional image such that the image is separated from this base line, and generates the intermediate image and the panoramic image.

(2) Switching from Panoramic Image to Omnidirectional Image

Figure 4:
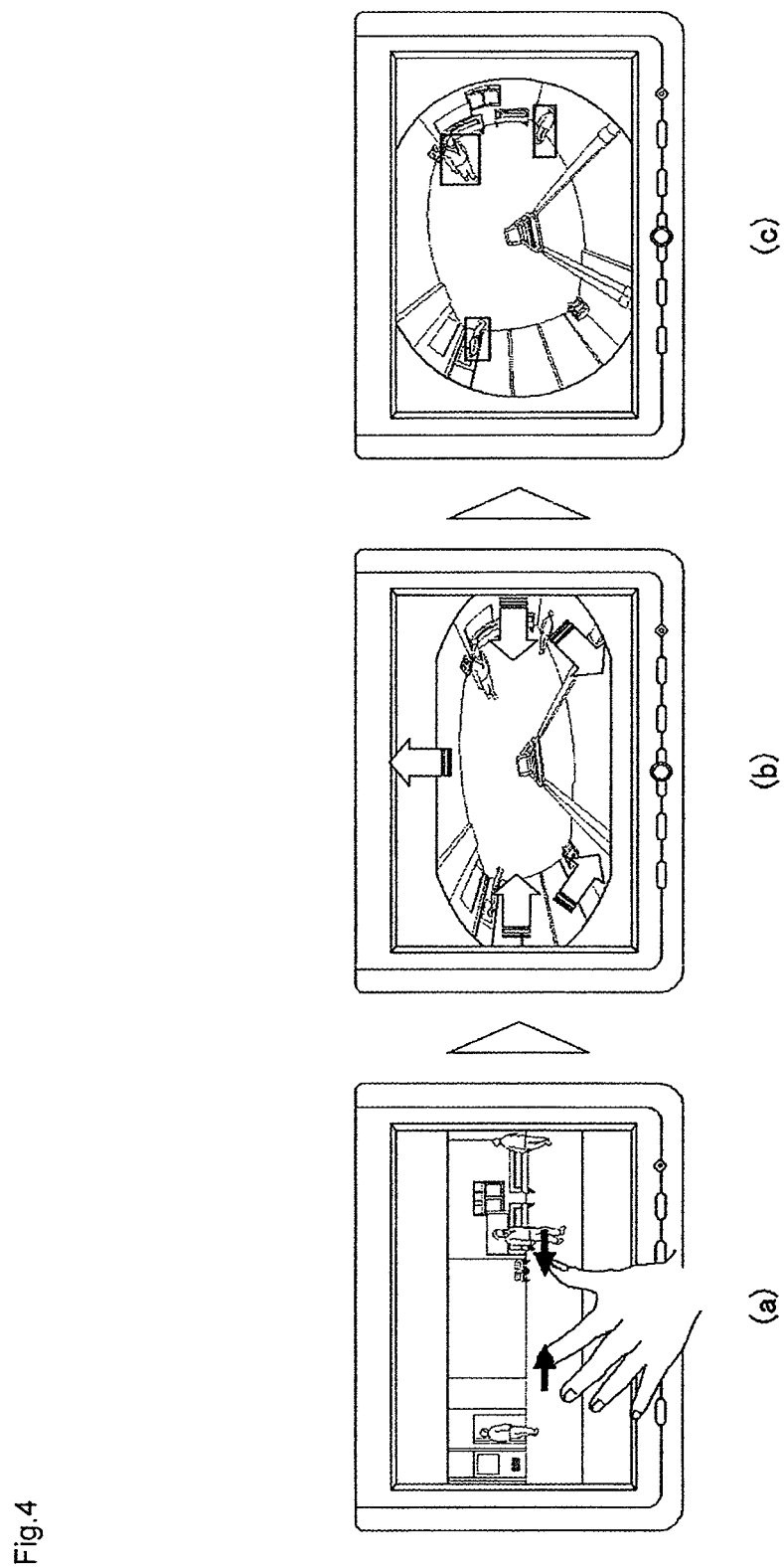
FIG. 4(a) is a view illustrating a panoramic image according to the embodiment of the present invention.
FIG. 4(b) is a view illustrating an intermediate image upon switching from a panoramic image to an omnidirectional image according to the embodiment of the present invention.
FIG. 4(c) is a view illustrating an omnidirectional image according to the embodiment of the present invention.

FIG. 4 is a view explaining switching from display of a panoramic image to display of an omnidirectional image. When a panoramic image is displayed as illustrated in FIG. 4(*a*), the user pinches in the panoramic image in the left and right direction to change the panoramic image to an omnidirectional image. The operation detecting unit 12 detects a type (pinching in), the speed and the position of this operation to output to the image correcting sequencer 13. The operation panel interface unit 131 of the image correcting sequencer 13 receives an input of content and the position of this operation, and outputs the content and the position to the timer control unit 132 and the target image deciding unit 133.

Based on a currently displayed image (panoramic image) and the content and the position of the operation, the target image deciding unit 133 decides that this operation is directed to changing the panoramic image to the omnidirectional image, decides that the target image is the omnidirectional image and outputs the result to the display image deciding unit 134 and the timer control unit 132. The timer control unit 132 determines a time spent for a transition from the panoramic image to the omnidirectional image based on the speed at which two fingertips come close upon pinch in, and starts a timer (that is, makes a transition time shorter when the speed at which fingertips come closer is faster).

The correction parameter calculating unit 135 generates correction parameters to generate the intermediate image according to the ratio of the current timer value with respect to the time out value, and outputs the correction parameters to the image correction interface unit 136. When the timer value reaches the time out value, the display image deciding unit 134 notifies to the image correction interface unit 136 that the timer value reaches the time out value.

When notified by the display image deciding unit 134 that the image which needs to be displayed is the intermediate image, the image correction interface unit 136 invokes intermediate image generation processing of the intermediate image generating unit 14, and outputs the correction parameters calculated by the correction parameter calculating unit 135 to the intermediate image generating unit 14. The intermediate image generating unit 14 corrects the omnidirectional image using the correction parameters inputted from the correction parameter calculating unit 135, generates an intermediate image and outputs the intermediate image to the image display unit 19.

The timer control unit 132 outputs the timer value to the display image deciding unit 134 at a predetermined intermediate image frame rate, and the display image deciding unit 134 decides whether or not a timer value reaches a time out value in each case, notifies to the image correction interface unit 136 that the image which needs to be displayed is an intermediate image until the timer value reaches the time out value, and outputs the time out value and a current timer value, or a ratio of the current timer value with respect to the time out value to the correction parameter calculating unit 135. Further, the correction parameter calculating unit 135 calculates correction parameters for generating an intermediate image, and the intermediate image generating unit 14 generates an intermediate image using the correction parameters. By this means, until time out occurs, the intermediate image is generated at the above intermediate image frame rate.

FIG. 4(*b*) illustrates the intermediate image generated as described above. The intermediate image transitions such that the panoramic image is stretched in an upper direction and crushed inward in the left and right direction.

When the display image deciding unit 134 decides that a timer value times out as a result that the timer control unit 132 outputs a timer value at an intermediate image frame rate, the image correction interface unit 136 notifies to the image queue 18 that an image which needs to be displayed is a target image (that is, an omnidirectional image) from the display image deciding unit 134. When receiving this notification, the image queue 18 outputs the omnidirectional image to the image display unit 19, and the image display unit 19 displays the omnidirectional image as illustrated in FIG. 4(*c*). In this case, a position pinched in on the panoramic image may correspond to a center on an entire periphery image which is a target image.

Figure 5:
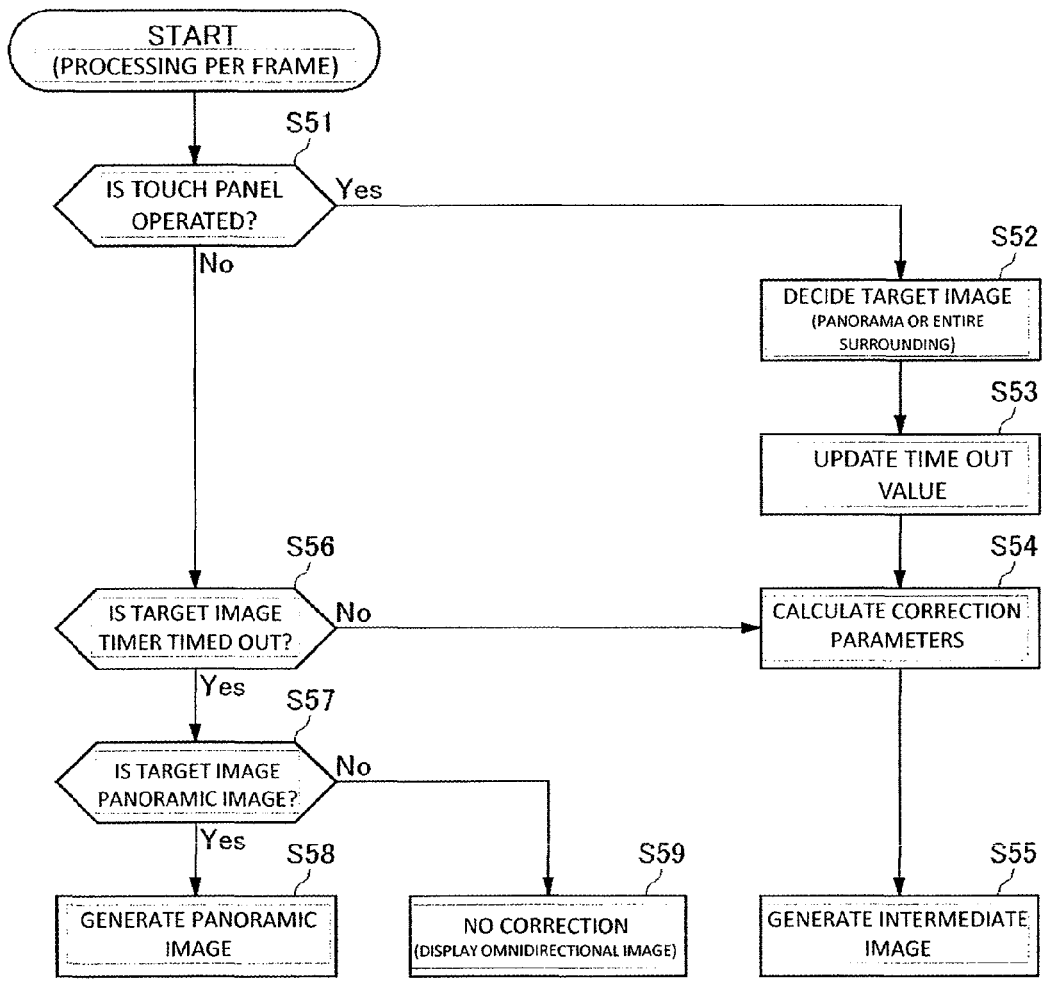
FIG. 5 is a flowchart illustrating switching from an omnidirectional image to a panoramic image and switching from a panoramic image to an omnidirectional image according to the embodiment of the present invention.

FIG. 5 is a flowchart of switching in case of above (1) and (2). The flow illustrated in FIG. 5 is repeatedly executed per frame. The operation detecting unit 12 monitors whether or not the panel interface 11 is operated (step S51), and, when the panel interface 11 is operated (YES in step S51), the target image deciding unit 133 of the image correcting sequencer 13 decides whether the target image is a panoramic image or an omnidirectional image (step S52).

Further, the timer control unit 132 updates a time out value (step S53), and the correction parameter calculating unit 135 generates correction parameters (step S54). Furthermore, the intermediate image generating unit 14 generates an intermediate image using the generated correction parameters.

Next, back to step S51, an operation of switching display has already been finished, and then it is decided that the panel interface 11 is not operated (NO in step S51) and whether or not a timer value of the timer control unit times out is decided (step S56). When the timer value does not time out (NO in step S56), the correction parameter calculating unit 135 calculates correction parameters again using this timer value (step S54) and the intermediate image generating unit 14 generates an intermediate image (step S55).

When it is decided in step S56 that the timer value times out by repeating the above processing (YES in step S56), the display image deciding unit 134 decides whether or not the target image is the panoramic image according to the decision of the target image deciding unit 133 (step S57). When the target image is the panoramic image (YES in step S57), the distortion corrected image generating unit 15 generates a panoramic image by correcting distortion of the omnidirectional image (step S58). When the target image is the omnidirectional image, the omnidirectional image is outputted as is without being corrected to the image display unit 19 from the image queue 18, and is displayed on the image display unit 19 (step S59).

(3) Switching from Omnidirectional Image to Multi Image Including Clipped Image

Figure 6:
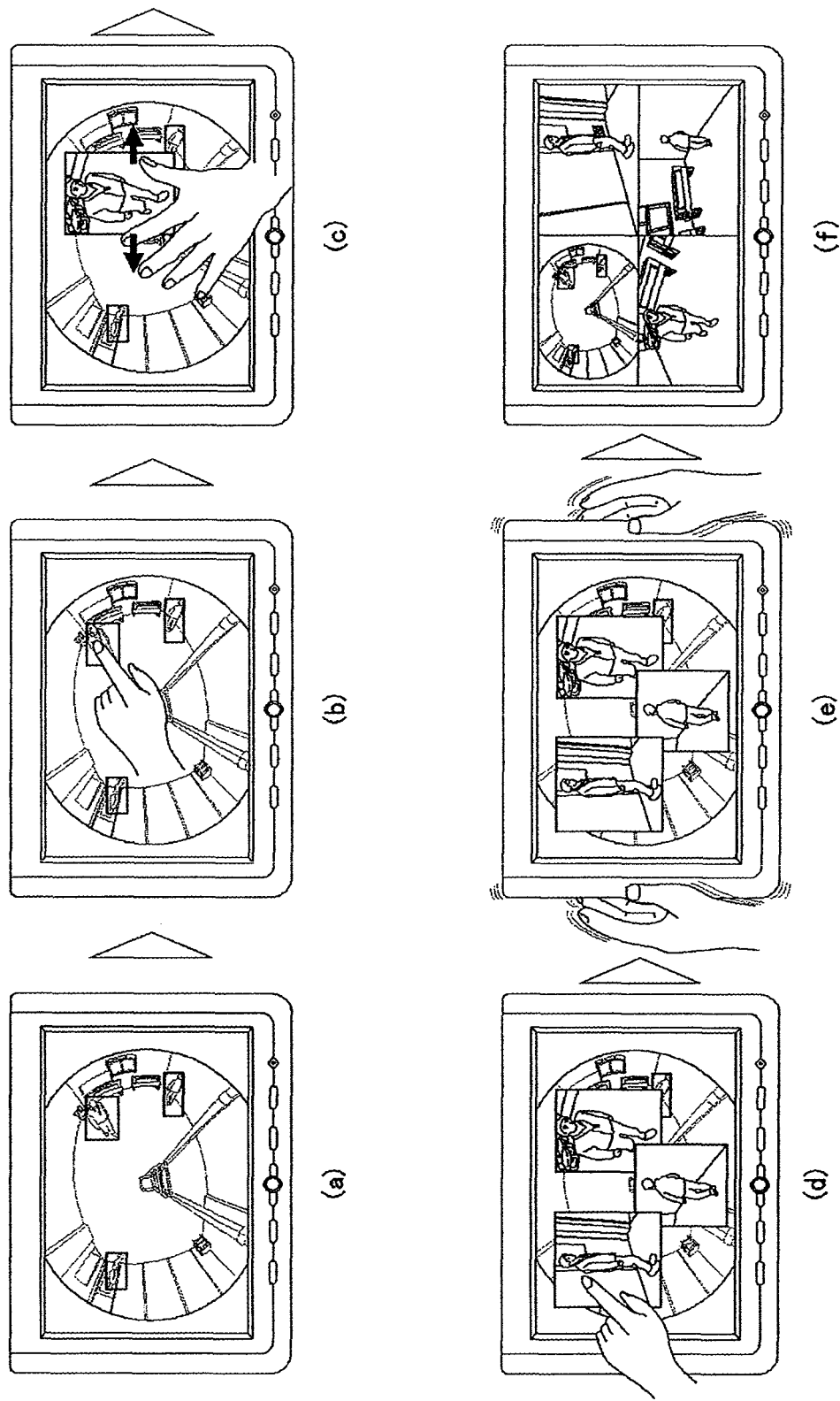
FIG. 6(a) is a view illustrating an omnidirectional image according to the embodiment of the present invention.
FIG. 6(b) is a view illustrating a tapping operation of specifying a clipped image according to the embodiment of the present invention.
FIG. 6(c) is a view illustrating a pinching out operation of enlarging a clipped image according to the embodiment of the present invention.
FIG. 6(d) is a view illustrating a dragging operation of moving a clipped image according to the embodiment of the present invention.
FIG. 6(e) is a view illustrating a shaking operation of switching to a multiscreen according to the embodiment of the present invention.
FIG. 6(f) is a view illustrating the multiscreen according to the embodiment of the present invention.

FIG. 6 is a view explaining switching from an omnidirectional image to a multi image including a clipped image. When an omnidirectional image is displayed as in FIG. 6(*a*), areas which have differences from a previous frame equal to a threshold or more are detected in the omnidirectional image as moving objects in advance by a moving object detecting means which is not illustrated and, if the user wants to clip one of moving object areas and display a clipped image, the user needs to tap an area which needs to be clipped as illustrated in FIG. 6(*b*).

The operation detecting unit 12 detects a type (tapping), the speed and the position of this operation to output to the image correcting sequencer 13. The image correcting sequencer 13 clips the moving object area from the omnidirectional image, and the distortion corrected image generating unit 15 corrects distortion of this clipping area and generates a clipped image. As illustrated in FIG. 6(*c*), the image display unit 19 superimposes the generated clipped image on the omnidirectional image to display. In this case, the clipped image is superimposed on the omnidirectional image based on a position as an initial position which overlaps the clipping area in the omnidirectional image.

As illustrated in FIG. 6(*c*), the user can enlarge the clipped image by pinching out the clipped image which is superimposed on the omnidirectional image and displayed. Further, the user can reduce the clipped image by pinching in the clipped image which is superimposed on the omnidirectional image and displayed.

Furthermore, as illustrated in FIG. 6(*d*), the user can also superimpose a plurality of clipped images on an omnidirectional image to display by generating clipped images of a plurality of areas. When the clipped image is superimposed on the omnidirectional image, if the user shakes the viewer terminal 1, the superimposed and displayed clipped images aligned with the omnidirectional image and displayed to generate a multiscreen as illustrated in FIG. 6(*f*).

(4) Switching from Single Panoramic Image to Double Panoramic Image

Figure 7:
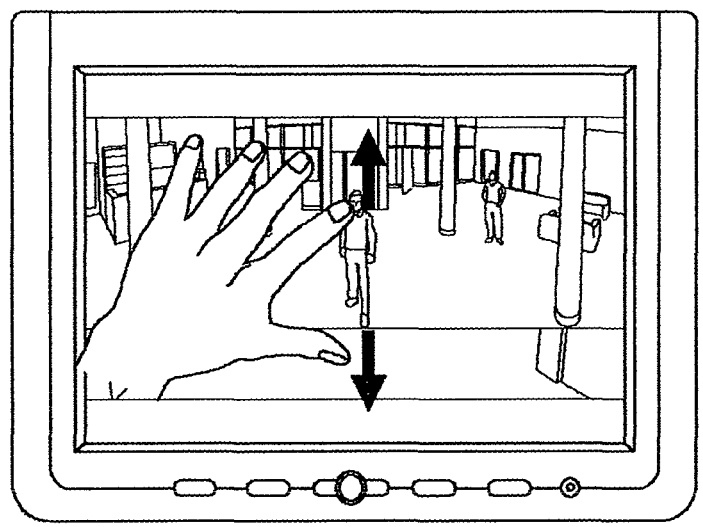
FIG. 7 is a view for explaining switching a single panoramic image to a double panoramic image according to the embodiment of the present invention.

FIG. 7 is a view for explaining switching from a single panoramic image to a double panoramic image. When one panoramic image is displayed (single panoramic image), panoramic images of two upper and lower stages are displayed (double panoramic image) by pinching out this panoramic image as illustrated in FIG. 7. The upper and lower panoramic images of the double panoramic image may display panoramic images which do not overlap each other and show 180 degrees of the horizontal angle of view.

(5) Switching from Double Panoramic Image to Single Panoramic Image

Figure 8:
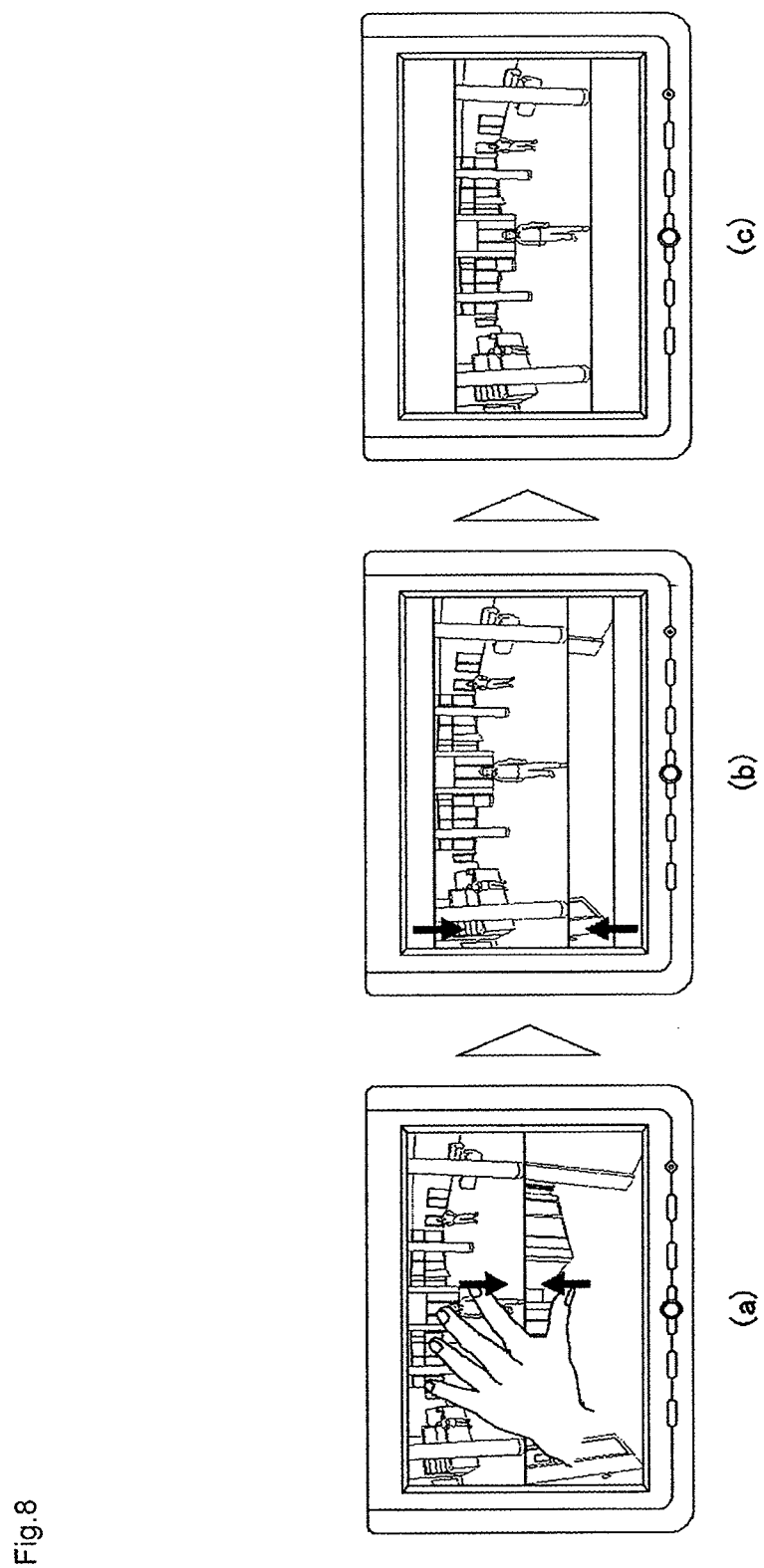
FIG. 8(a) is a view illustrating a pinching in operation of switching from a double panoramic image to a single panoramic image according to the embodiment of the present invention.
FIG. 8(b) is a view illustrating an intermediate image upon switching from a double panoramic image to a single panoramic image according to the embodiment of the present invention.
FIG. 8(c) is a view illustrating a single panoramic image according to the embodiment of the present invention.

FIG. 8 is a view explaining switching from a double panoramic image to a single panoramic image. As illustrated in FIG. 8(*a*), when the double panoramic image is displayed, if the user wants to change this double panoramic image to a single panoramic image, the user touches the upper and lower panoramic images one by one by the fingers and pinches the images upward and downward such that the distance between these images becomes close.

As illustrated in FIG. 8(*b*), the intermediate image correcting unit 15 generates an intermediate image in which the upper panoramic image moves downward and the lower panoramic image moves upward such that the two panoramic images overlap (the upper panoramic image becomes a top surface), and finally displays only the upper panoramic image as illustrated in FIG. 8(c).

(6) Scrolling of Panoramic Image

Figure 9:
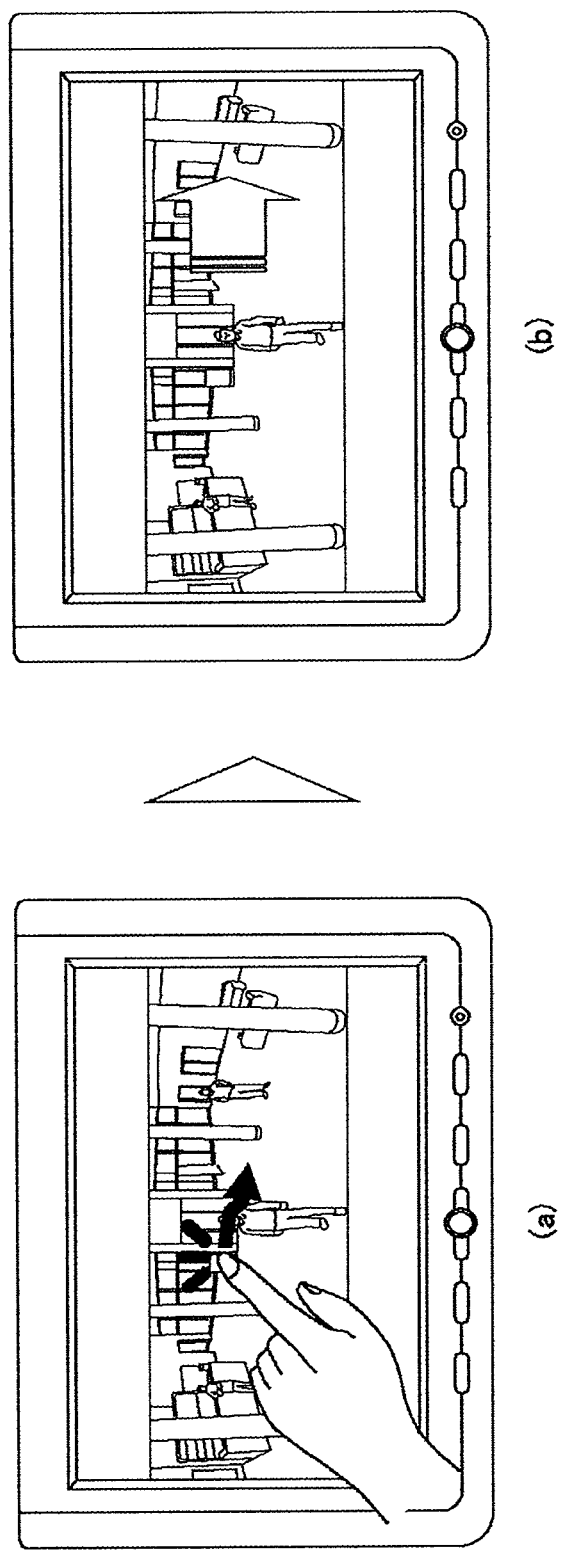
FIG. 9(a) is a view illustrating a flicking operation of scrolling a single panoramic image according to the embodiment of the present invention.
FIG. 9(b) is a view illustrating scrolling of a single panoramic image according to the embodiment of the present invention.

FIG. 9 is a view explaining scrolling of a single panoramic image. When the panoramic image is displayed as illustrated in FIG. 9(a), if the user wants to scroll this panoramic image in the horizontal direction, the user flicks the panoramic image in a direction in which the panoramic image needs to be scrolled.

In an example of FIG. 9 (a), the panoramic image is flicked in the right direction, and the panoramic image moves in the right direction as illustrated in FIG. 9 (b). In addition, after flicking, the panoramic image may be moved according to the quantity matching strength of flicking (a moving speed of a finger at which the finger is separated from the panel interface 11) and scrolling may be stopped and, when flicking is performed, scrolling may be continued at a certain speed. Further, a moving speed of a panoramic image may be determined according to the strength of flicking.

Figure 10:
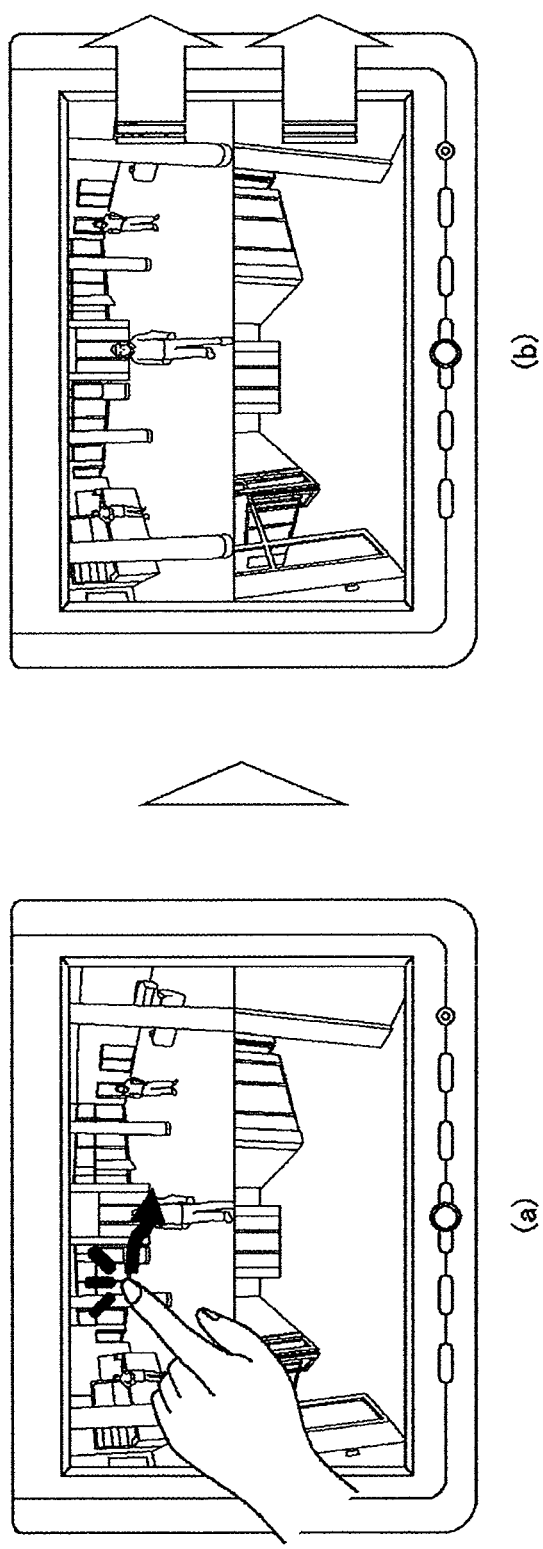
FIG. 10(a) is a view illustrating a flicking operation of scrolling a double panoramic image according to the embodiment of the present invention.
FIG. 10(b) is a view illustrating scrolling of a double panoramic image according to the embodiment of the present invention.

FIG. 10 is a view explaining scrolling of a double panoramic image. When the panoramic image is displayed as illustrated in FIG. 10(a), if the user wants to scroll this double panoramic image in the horizontal direction, the user flicks one of upper and lower panoramic image of the double panoramic image in a direction in which the panoramic image needs to be scrolled.

In an example of FIG. 10(a), the upper panoramic image is flicked in the right direction, and the upper panoramic image moves in the right direction as illustrated in FIG. 10(b). In this case, the lower panoramic image is also moved rightward according to upward scrolling. In addition, similar to a single panoramic image, after flicking, upper and lower panoramic images may be moved according to the quantity matching the strength of flicking and, when flicking is performed, scrolling may be continued at a certain speed. Further, moving speeds of upper and lower panoramic images may be determined according to the strength of flicking.

Figure 11:
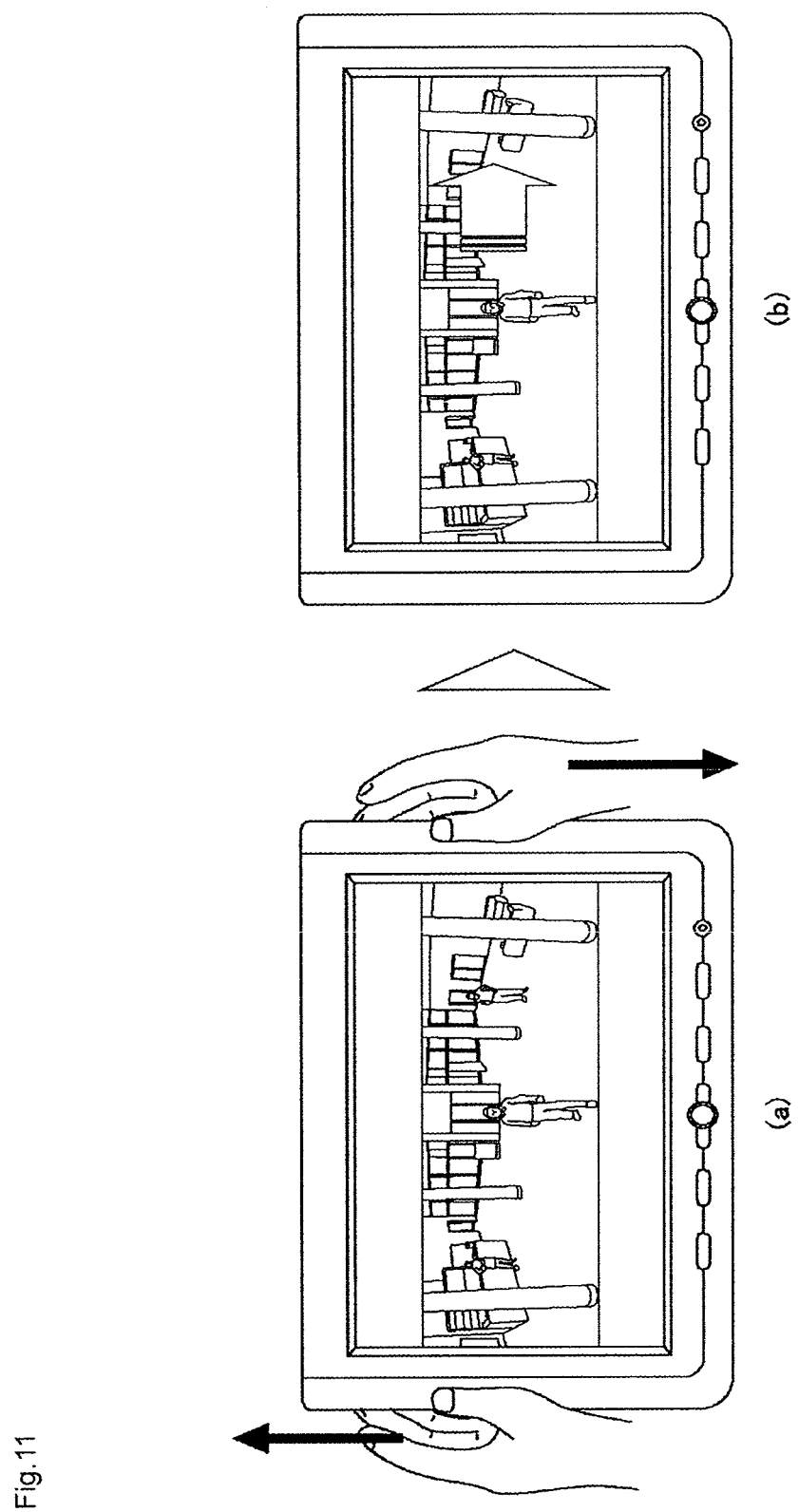
FIG. 11(a) is a view illustrating a modified example of an operation of scrolling a panoramic image according to the embodiment of the present invention.
FIG. 11(b) is a view illustrating scrolling of a panoramic image according to the embodiment of the present invention.

FIG. 11 is a view explaining a modified example of scrolling of a panoramic image. A panoramic image can be scrolled by the above flicking and, in addition, by tilting the viewer terminal 1. As illustrated in FIG. 11(a), when the panoramic image is displayed, a panoramic image moves rightward as illustrated in FIG. 11(b) by tiling the viewer terminal 1 such that a right side of the viewer terminal 1 goes downward and the left side goes upward. Further, by tilting the viewer terminal 1 in a reverse direction, that is, by tilting the right side upward and the left side downward, the panoramic image moves leftward. In addition, also in this modified example, a moving speed of a panoramic image may be varied according to the degree of tilt.

In addition, a panoramic image can be scrolled by dragging. In this case, the panoramic image moves by the amount of dragging in a direction in which the panoramic image is dragged by dragging.

(7) Change of Clipping Range of Clipped Image

Figure 12:
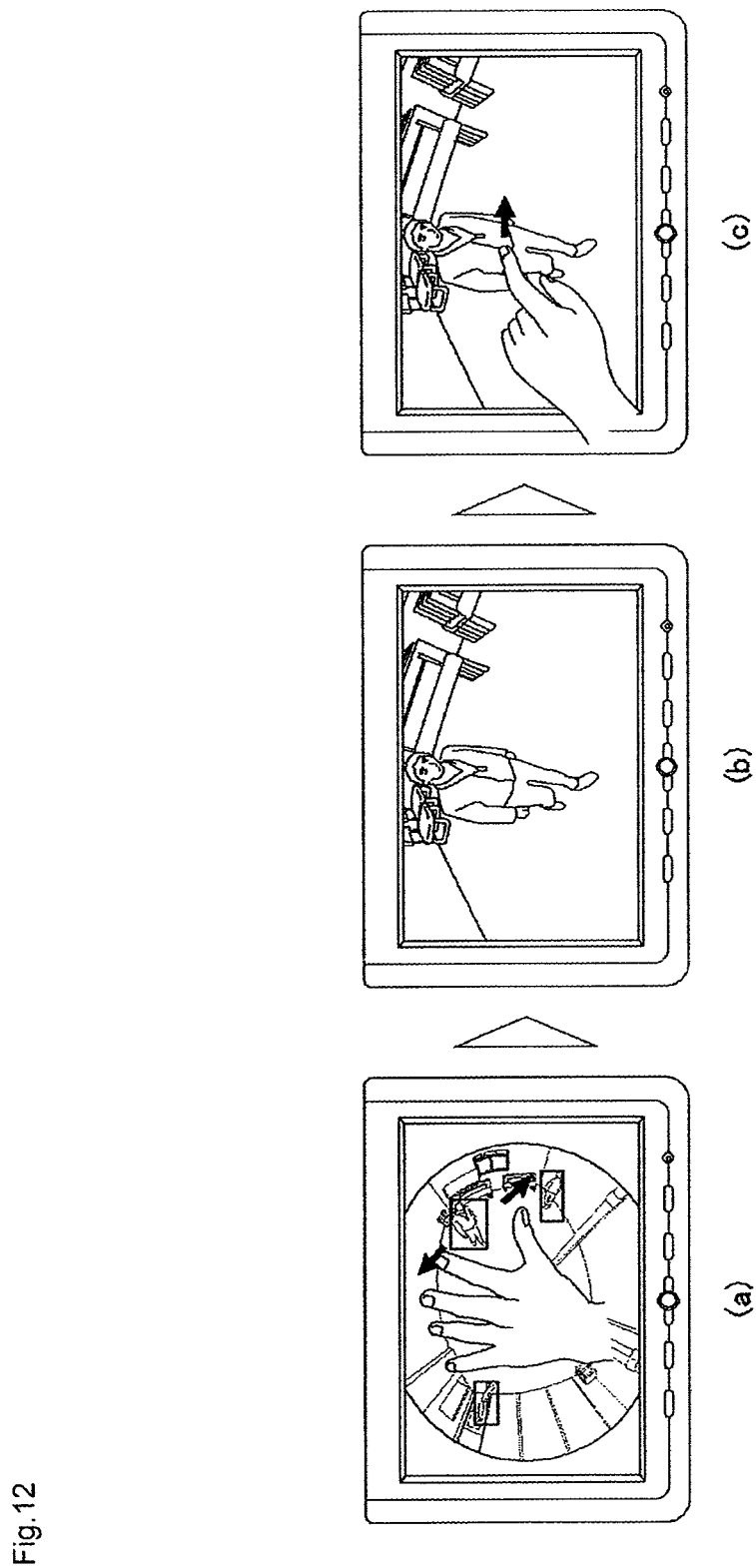
FIG. 12(a) is a view illustrating a pinching out operation of displaying a high quality image according to the embodiment of the present invention.
FIG. 12(b) is a view illustrating display of a high quality image according to the embodiment of the present invention.
FIG. 12(c) is a view illustrating a dragging operation of moving a clipping area of a high quality image according to the embodiment of the present invention.

FIG. 12 is a view explaining change of a clipping range of a clipped image. When an omnidirectional image is displayed as illustrated in FIG. 12(a), if the user wants to display a high quality image (of high resolution without distortion) of a partial area of this omnidirectional image, the user pinches out this area. In addition, only the area detected as a moving object by the moving object detecting means may be a pinching out target.

When pinching out is performed, the distortion corrected image generating unit 15 generates a clipped image of this area, and the image display unit 19 displays this clipped image in a full screen as illustrated in FIG. 12(b). When a moving object moves in a clipped image, if the user wants to move an area for which a clipped image including this moving object is generated, the clipped image displayed in the full screen is dragged in a direction in which the image needs to be displayed as illustrated in FIG. 12(c). The distortion corrected image generating unit 15 moves the clipping area in a dragging direction according to the amount of dragging and generates a new clipped image, and the image display unit 19 displays a clipped image continuously generated during dragging.

(8) Rotation of Omnidirectional Image

Figure 13:
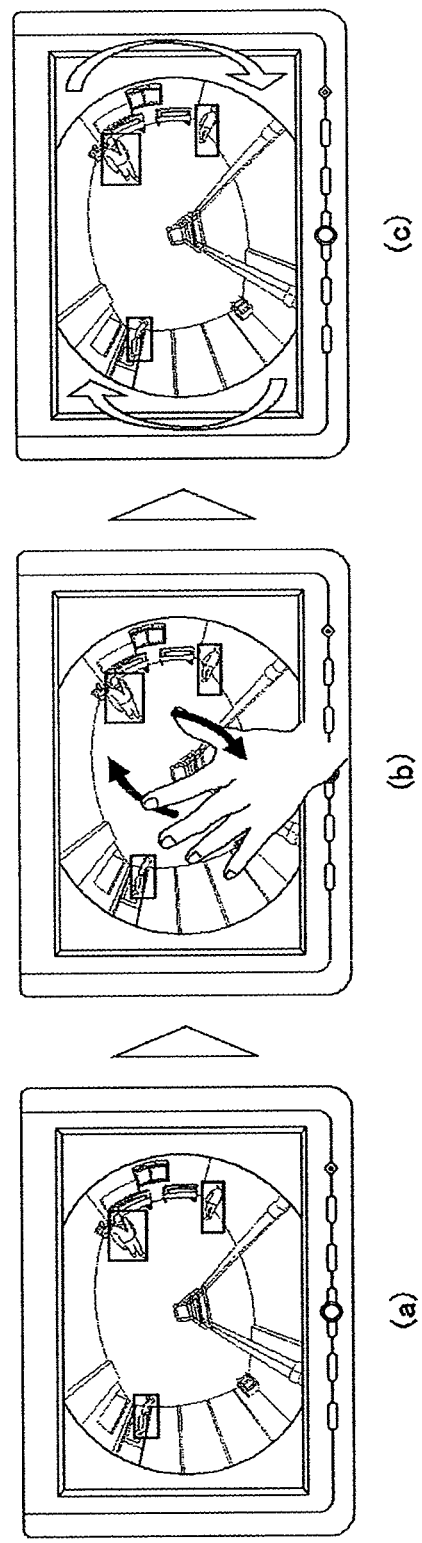
FIG. 13(a) is a view illustrating an omnidirectional image according to the embodiment of the present invention.
FIG. 13(b) is a view illustrating a rotating operation of rotating an omnidirectional image according to the embodiment of the present invention.
FIG. 13(c) is a view illustrating rotation of an omnidirectional image according to the embodiment of the present invention.

FIG. 13 is a view explaining rotation of an omnidirectional image. As illustrated in FIG. 13(a), when an omnidirectional image is displayed, if this omnidirectional image needs to be rotated, as illustrated in FIG. 13(b), two arbitrary points in the image are touched by the two fingers simultaneously and one or both of the two fingers are moved on the panel interface 11 such that a line connecting the two points rotates in the screen.

According to this rotation, the image display unit 19 changes a direction of the omnidirectional image to be displayed. In addition, when the two fingers perform flicking simultaneously, the omnidirectional image may continue rotating even after the fingers are separated from the panel interface 11.

The above switching of display can be variously modified. Hereinafter, modified examples will be described.

First Modified Example

Figure 14:
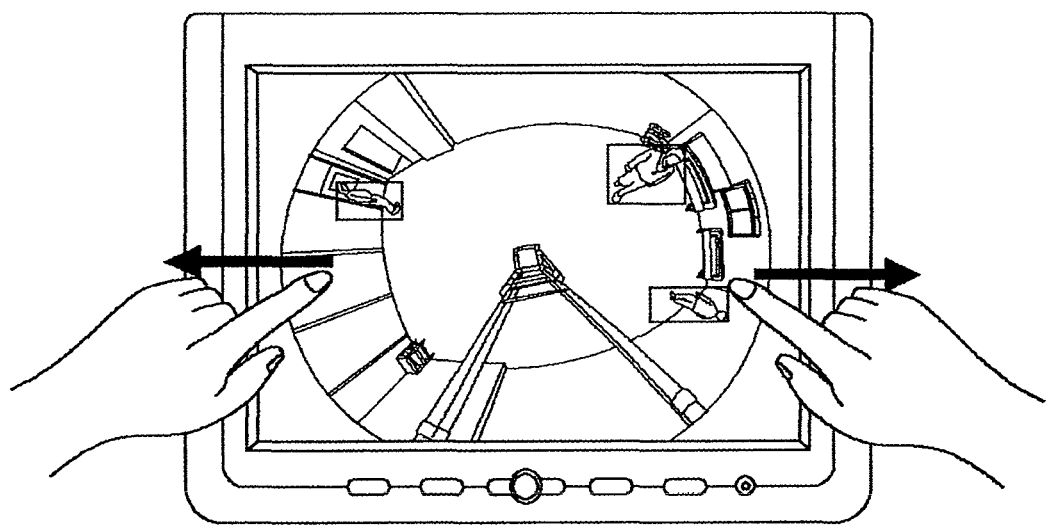
FIG. 14 is a view illustrating switching from an omnidirectional image to a panoramic image according to a first modified example of the embodiment of the present invention.

FIG. 14 is a view illustrating a first modified example. The first modified example is a modified example of switching from an omnidirectional image to a panoramic image. When the omnidirectional image is displayed as illustrated in FIG. 14, if the user wants to expand this omnidirectional image to the panoramic image, the user touches both left and right portions of the omnidirectional image by the fingers, and pinches out the omnidirectional image to widen outward. In addition, when a monitor is small, this pinching out can be performed by one hand (for example, the thumb and the forefinger), and, when a monitor is large, pinching out may be performed by the both hands as illustrated in FIG. 14.

According to the above pinching out, the omnidirectional image is continuously expanded to the panoramic image by being stretched outward. In this case, the omnidirectional image can be expanded to the panoramic image such that, for example, portions touched by the two fingers are connected by the line and a center coordinate is positioned on the line stretched from a midpoint in the vertical direction.

Also according to this first modified example, pinching out of both left and right ends of an omnidirectional image and switching of display that an omnidirectional image is stretched outward and transitions to a panoramic image sensuously match, so that operability and intelligibility for users improve.

Second Modified Example

Figure 15:
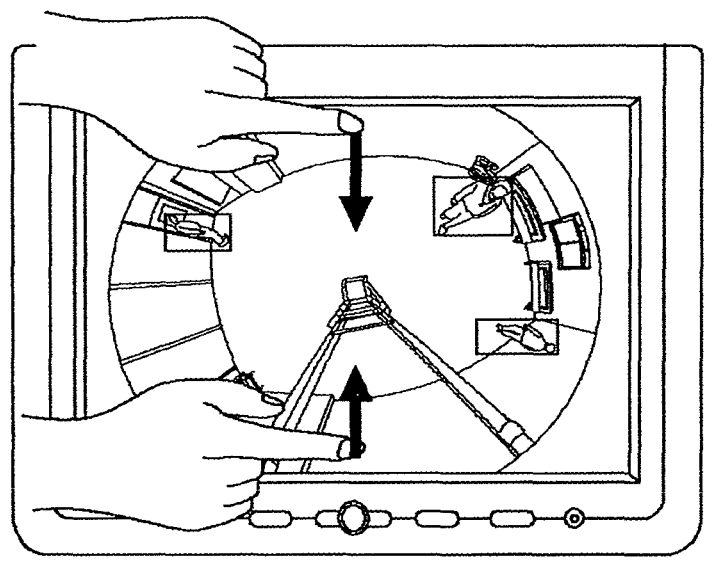
FIG. 15 is a view illustrating switching from an omnidirectional image to a panoramic image according to a second modified example of the embodiment of the present invention.

FIG. 15 is a view illustrating a second modified example. The second modified example is a modified example of switching from an omnidirectional image to a panoramic image. When the omnidirectional image is displayed as illustrated in FIG. 15, if the user wants to expand this omnidirectional image to the panoramic image, the user touches both left and right portions of the omnidirectional image by the fingers, and pinches in the omnidirectional image to narrow inward. In addition, when a monitor is small, this pinching in can be performed by one hand (for example, the thumb and the forefinger), and, when a monitor is large, pinching in may be performed by the both hands as illustrated in FIG. 15.

According to the above pinching in, the omnidirectional image is continuously expanded to a panoramic image by being crashed inward. In this case, the omnidirectional image can be expanded to the panoramic image such that, for example, portions touched by the two fingers are connected by the line and a center coordinate is positioned on the line.

Also according to this second modified example, pinching in of both upper and lower ends of an omnidirectional image and switching of display that an omnidirectional image is crashed outward and transitions to a panoramic image sensuously match, so that operability and intelligibility for users improve.

Third Modified Example

FIG. 16 is a view illustrating a third modified example. The third modified example is a modified example of switching from an omnidirectional image to a panoramic image. When the omnidirectional image is displayed as illustrated in FIG. 16(*a*), if the user wants to expand this omnidirectional image to the panoramic image, a center portion of the omnidirectional image is dragged by making a slit in the left and right direction as illustrated in FIG. 16(*a*) and then the omnidirectional image is pinched out upward and downward by the two fingers crossing the line provided as a slit as illustrated in FIG. 16(*b*).

According to the above series of operations, the omnidirectional image is provided with a slit from a dragging line, and is continuously expanded to a panoramic image in a donut shape. In this case, the omnidirectional image can be expanded to the panoramic image such that, for example, a center coordinate is positioned on the line stretched from a midpoint of the dragging line in the vertical direction.

Also according to this third modified example, pinching out of an omnidirectional image by making a slit in the center portion of the omnidirectional image and switching of display that a slit is widened such that the omnidirectional image has a donut shape and transitions to a panoramic image sensuously match, so that operability and intelligibility for users improve.

In addition, although, in the above example, the center portion of the omnidirectional image is dragged in the horizontal direction to make a slit therein and the omnidirectional image is pinched out upward and downward by opening this slit, the present invention is not limited to this, and the center portion of the omnidirectional image may be dragged in the vertical direction to make a slit therein and the omnidirectional image is pinched out leftward and rightward by opening this slit or the omnidirectional image may be formed in a donut shape by widening the slit and transition to a panoramic image.

Fourth Modified Example

FIG. 17 is a view illustrating a fourth modified example. The fourth modified example is a modified example of switching from an omnidirectional image to a panoramic image. In this modified example, display of an omnidirectional image is switched to display of a double panoramic image. When an omnidirectional image is displayed as illustrated in FIG. 17(*a*), if the user wants to expand this omnidirectional image to a double panoramic image, the user drags the omnidirectional image such that a slit is made in a diameter in the horizontal direction of the omnidirectional image as illustrated in FIG. 17(*a*). Further, as illustrated in FIG. 17(*b*), the omnidirectional image is pinched out upward and downward by the two fingers crossing the slit line.

According to the above series of operations, the omnidirectional image is expanded as upper and lower panoramic images at a boundary of a dragging line, and then a double panoramic image is displayed. In this case, the omnidirectional image can be expanded to the upper and lower panoramic images such that, for example, a center coordinate is positioned on the line stretched from a midpoint of the dragging line in the vertical direction.

Also according to this fourth modified example, pinching out of an omnidirectional image by making a slit in the center portion of the omnidirectional image and switching of display that an upper half and a lower half are expanded to an omnidirectional image to panoramic images at a boundary of a slit and are vertically arranged sensuously match, so that operability and intelligibility for users improve.

Fifth Modified Example

Figure 19:
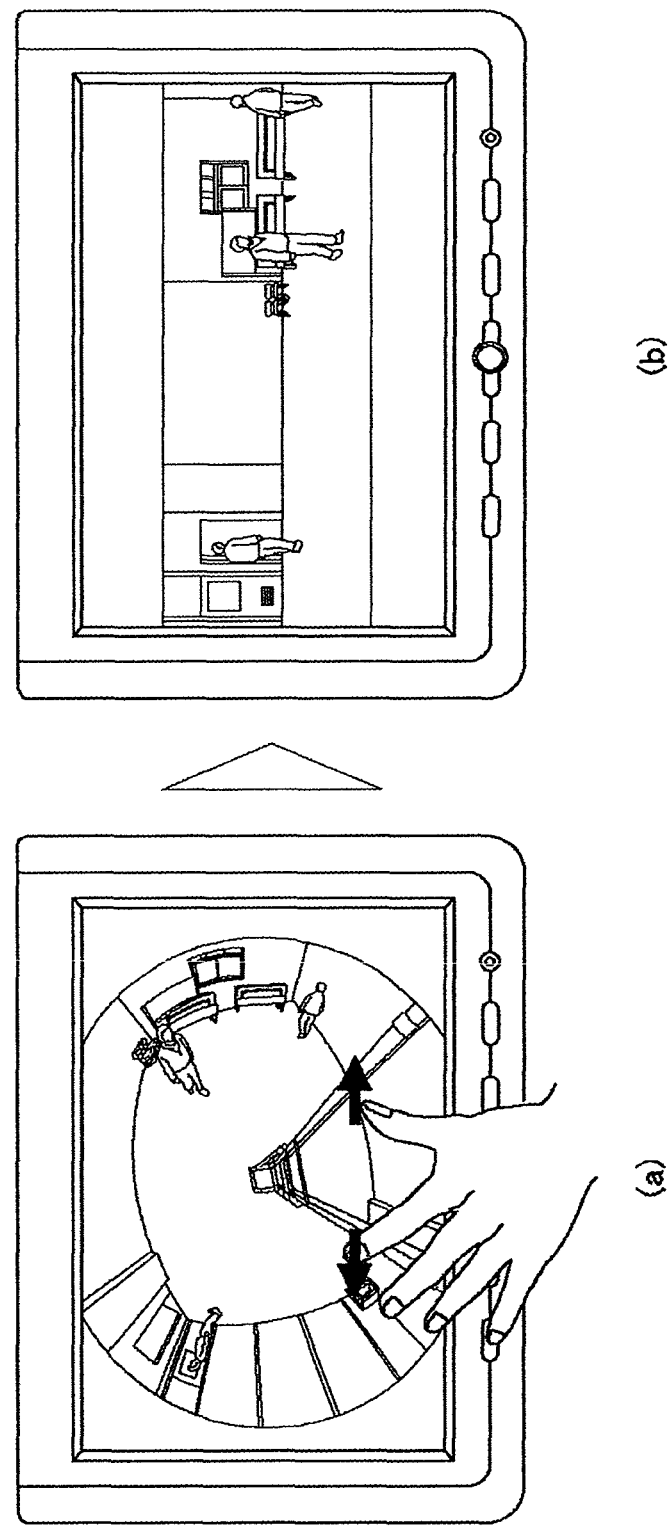
FIG. 19(a) is a view illustrating a pinching out operation (circumferential direction) of switching display of an omnidirectional image according to the fifth modified example of the embodiment of the present invention.
FIG. 19(b) is a view illustrating a panoramic image according to the fifth embodiment of the embodiment of the present invention.

FIGS. 18 and 19 are views illustrating a fifth modified example. The fifth modified example is a modified example of switching from an omnidirectional image. In this modified example, a target image is switched according to a direction in which an omnidirectional image is pinched out. When pinching out is performed in a radial direction of the omnidirectional image as illustrated in FIG. 18(*a*), a multi image including a clipped image is a target image as illustrated in FIG. 18(*b*) and the same operation as described in above "(3) switching from omnidirectional image to multi image including clipped image" is performed. In this case, a person at a pinched out position is enlarged and displayed as a clipped image.

Meanwhile, when pinching out is performed in a circumferential direction of the omnidirectional image as illustrated in FIG. 19(*a*), a panoramic image is a target image as illustrated in FIG. 19(*b*), and the same operation as switching to a panoramic image described in above "(1) switching from omnidirectional image to panoramic image" is performed. In this case, panoramic expansion is performed based on a line segment as a base line which connects a center of a line segment connecting finger positions which are pinched out and a center of the omnidirectional image.

Sixth Modified Example

Figure 20:
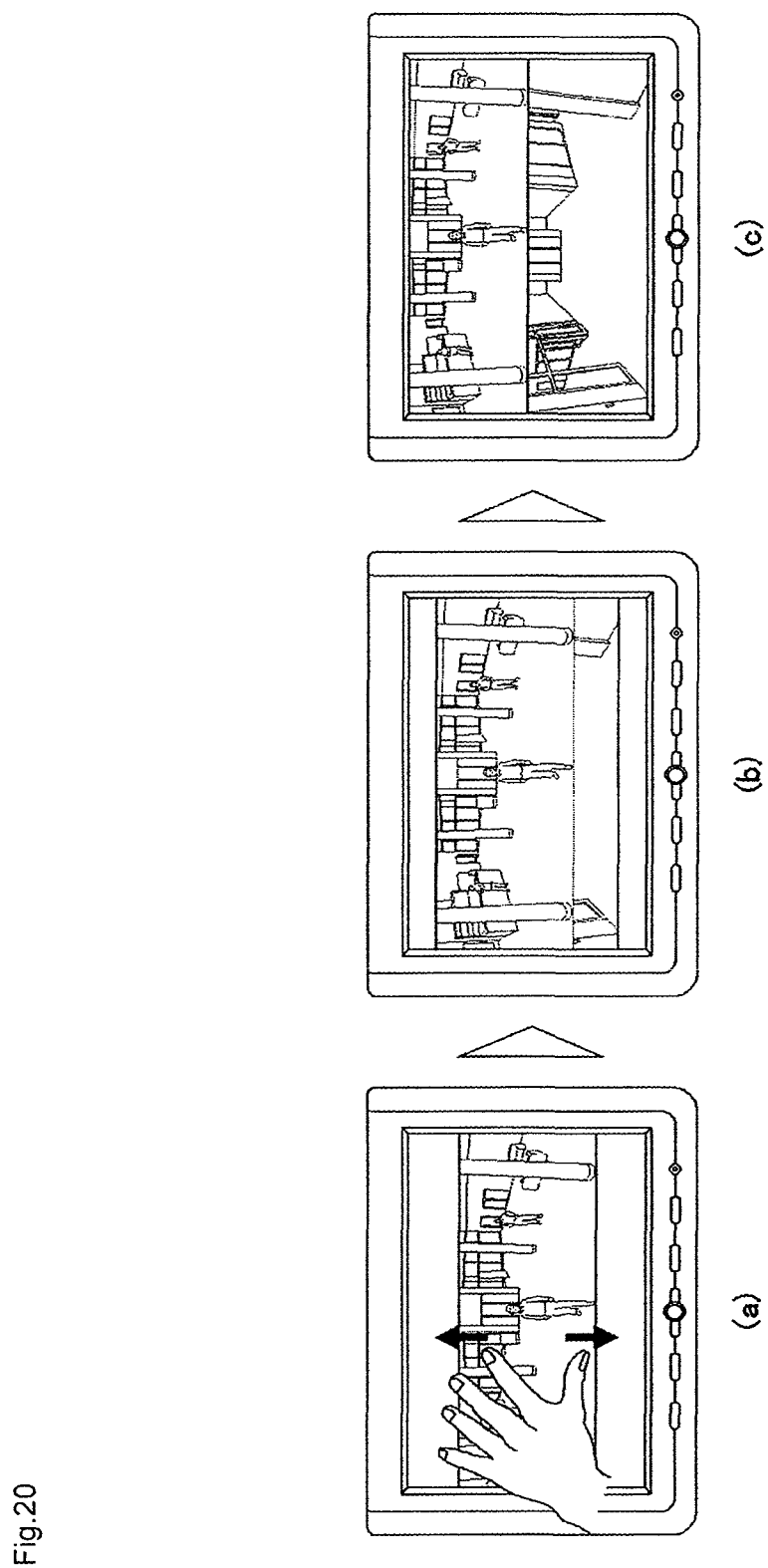
FIG. 20(a) is a view illustrating a pinching out operation (vertical direction) of switching a single panoramic image to a double panoramic image according to a sixth modified example of the embodiment of the present invention.
FIG. 20(b) is a view illustrating an intermediate image upon switching from a single panoramic image to a double panoramic image according to the sixth modified example of the embodiment of the present invention.
FIG. 20(c) is a view illustrating a double panoramic image according to the sixth modified example of the embodiment of the present invention.
Figure 21:
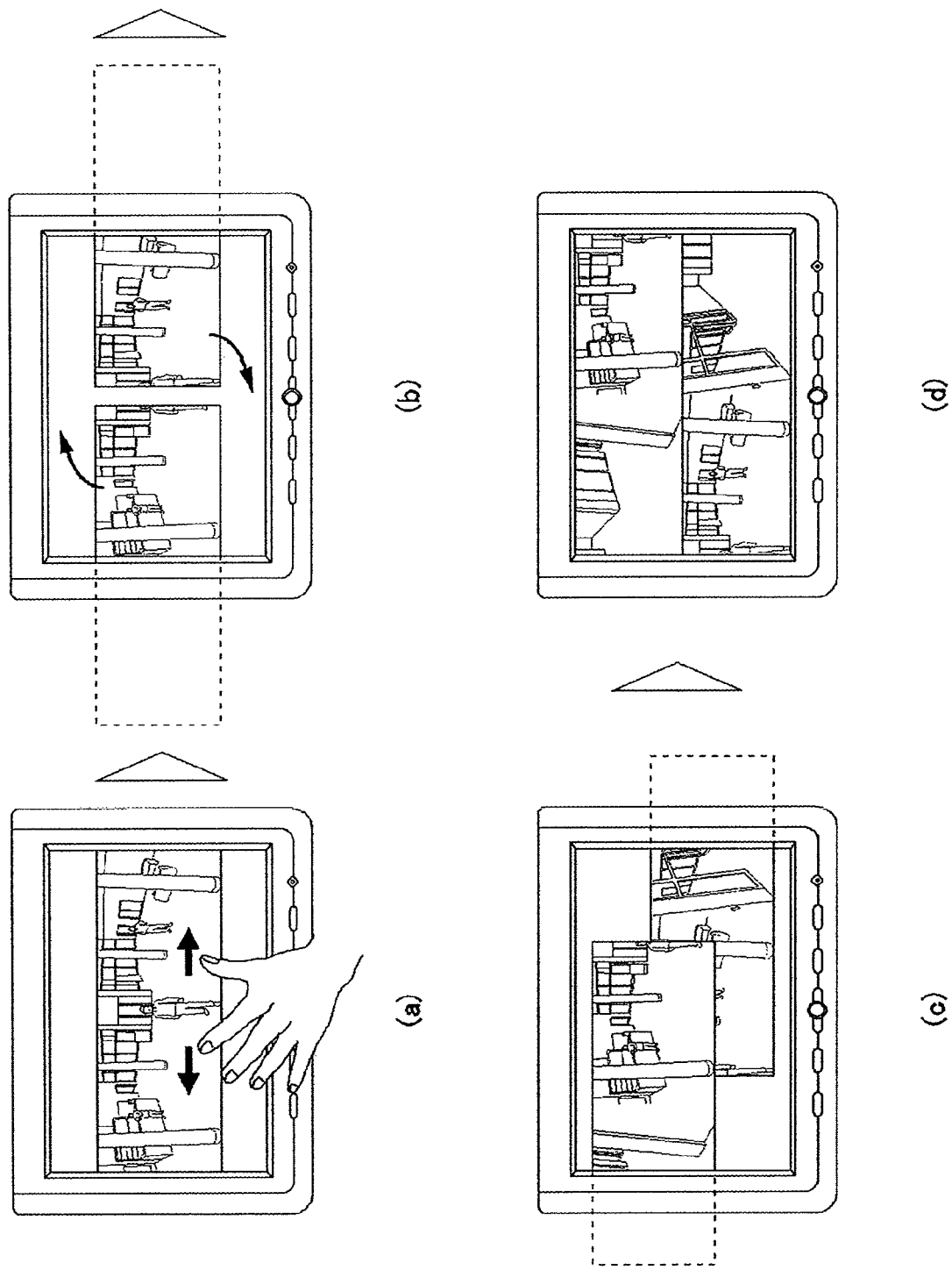
FIG. 21(a) is a view illustrating a pinching out operation (horizontal direction) of switching a single panoramic image to a double panoramic image according to the sixth modified example of the embodiment of the present invention.
FIG. 21(b) is a view illustrating an intermediate image upon switching from a single panoramic image to a double panoramic image according to the sixth modified example of the embodiment of the present invention.
FIG. 21(c) is a view illustrating an intermediate image upon switching from a single panoramic image to a double panoramic image according to the sixth modified example of the embodiment of the present invention.
FIG. 21(d) is a view illustrating a double panoramic image according to the sixth modified example of the embodiment of the present invention.

FIGS. 20 and 21 are views illustrating a sixth modified example. The sixth modified example is a modified example of switching from a single panoramic image to a double panoramic image. In this modified example, an intermediate image is switched according to a direction in which the single panoramic image is pinched out. When a single panoramic image is pinched out in a vertical direction as illustrated in FIG. 20(*a*), an intermediate image is generated and displayed similarly as described in "(4) switching from single panoramic image to double panoramic image" as illustrated in FIG. 20 (*b*), and a double panoramic image illustrated in FIG. 20(*c*) is displayed.

Meanwhile, when the single panoramic image is pinched out in the horizontal direction as illustrated in FIG. 21(*a*), a panoramic image is cut at a vertical line segment which passes a center of a line segment connecting finger positions which are pinched out as illustrated in FIG. 21(*b*), an intermediate image in which one of two cut panoramic images moves upward and the other one moves downward is generated and displayed as illustrated in FIG. 21(*c*), and a double panoramic image illustrated in FIG. 21(d) is displayed. In addition, portions indicated by dotted lines in FIGS. 21(b) and 21(c) are hidden portions which are not displayed in the intermediate image. These hidden portions are gradually displayed as the intermediate image develops.

As described above, the viewer terminal 1 according to the present embodiment can switch various types of display by a simple operation through an intuitive user interface using the panel interface 11. Further, the viewer terminal 1 according to the present embodiment generates and displays an intermediate image during switching of display, so that the user can easily recognize a correlation before and after display is switched.

In addition, the operation of the above viewer terminal 1 may be realized by executing a computer program in a computation processing device provided in the viewer terminal 1.

Although the preferred embodiment of the present invention which can be thought of at the present has been described above, the present embodiment can be variously deformed and the attached claims are intended to incorporate all such modifications within the spirit and the scope of the present invention.

INDUSTRIAL APPLICABILITY

As described above, the present invention is useful as, for example, a display device which allows display of an omnidirectional image and display of a distortion corrected image to be intuitively switched by a simple operation, and displays a video image captured by an omnidirectional camera.

REFERENCE SIGNS LIST

1 VIEWER TERMINAL
11 PANEL INTERFACE
12 OPERATION DETECTING UNIT
13 IMAGE CORRECTING SEQUENCER
14 INTERMEDIATE IMAGE GENERATING UNIT
15 DISTORTION CORRECTED IMAGE GENERATING UNIT
16 OMNIDIRECTIONAL IMAGE ACQUIRING UNIT
17 OMNIDIRECTIONAL IMAGE DECODING UNIT
18 IMAGE QUEUE
19 IMAGE DISPLAY UNIT
131 PANEL OPERATION INTERFACE UNIT
132 TIMER CONTROL UNIT
133 TARGET IMAGE DECIDING UNIT
134 DISPLAY IMAGE DECIDING UNIT
135 CORRECTION PARAMETER CALCULATING UNIT
136 IMAGE CORRECTION INTERFACE UNIT

What is claimed is:

1. A method for processing an image, the method comprising:
   receiving an omnidirectional image;
   receiving, with a processor, an instruction to process the omnidirectional image to generate a rectangular image, in response to user input via a display on the omnidirectional image; and
   generating at least two intermediate images showing a dewarping transition between the omnidirectional image and the rectangular image, including generating a second intermediate image having a greater amount of correction for distortion than a first intermediate image.

2. The method according to claim 1, wherein
the at least two intermediate images comprise an image representing an area smaller than an area represented in the omnidirectional image, captured by a camera having a fish eye lens, and the area is larger than an area represented in the rectangular image and identified via the user input on the omnidirectional image on the display.

3. The method according to claim 1, further comprising:
generating at least one additional rectangular image that is generated based on a moving instruction received to move a display area for which the rectangular image is generated,
wherein the at least one additional rectangular image represents an area, being different from an area represented in the rectangular image, in the omnidirectional image, the omnidirectional image having distortion, and wherein the rectangular image and the additional rectangular image are generated by correcting the distortion.

4. The method according to claim 3, wherein
the at least one additional rectangular image is generated for continuous display based on the moving instruction, the at least one additional rectangular image being moved across the display in accordance with a movement of the received moving instruction.

5. The method according to claim 3, wherein
the at least one additional rectangular image is generated for continuous display based on a drag operation, the at least one additional rectangular image being moved across the display in accordance with a movement of the received moving instruction.

6. The method according to claim 1, further comprising applying at least one correction parameter to the omnidirectional image to generate the rectangular image.

7. The method according to claim 1, wherein
the omnidirectional image appears distorted on the display as a distance from a center of the omnidirectional image increases.

8. The method according to claim 1, wherein
the at least two intermediate images comprise a sequence of images.

9. The method according to claim 1, further comprising:
setting a time parameter for the display of the rectangular image based upon at least one characteristic of the user input.

10. The method according to claim 1, wherein the user input comprises a dragging operation on an outer area of the omnidirectional image on the display toward a center of the omnidirectional image on the display.

11. The method according to claim 1, wherein
the rectangular image is generated based upon a type and position of the user input.

12. The method according to claim 1, further comprising:
enlarging or reducing the rectangular image for display in response to received user input.

13. A method for processing an image, the method comprising:
   receiving a circular omnidirectional image;
   receiving, with a processor, an instruction to process the circular omnidirectional image to generate a rectangular image, in response to user input via a display on the circular omnidirectional image; and
   generating at least one intermediate image showing a dewarping transition between the circular omnidirectional image and the rectangular image, the at least one intermediate image representing an area smaller than an area represented in the omnidirectional image and the area is larger than an area represented in the rectangular image.

14. The method according to claim 13, wherein
a display of the rectangular image is superimposed upon a display of the circular omnidirectional image corresponding to a respective location in the circular omnidirectional image.

15. The method according to claim 13, wherein
the user input comprises a touch input, the touch input comprising:
at least one of a tapping operation, a dragging operation, a flicking operation, a pinching out operation, a pinching in operation, and a rotation operation.

16. The method according to claim 13, further comprising:
receiving a position of the user input with respect to a position on the circular omnidirectional image on the display.

17. The method according to claim 13, wherein
the circular omnidirectional image appears distorted on the display as a distance from a center of the circular omnidirectional image increases.

18. The method according to claim 13, wherein
the rectangular image is a clipped image based on an area identified via the user input on the circular omnidirectional image on the display.

19. The method according to claim 13, wherein the user input comprises a dragging operation on an outer area of the circular omnidirectional image on the display toward a center of the circular omnidirectional image on the display.

20. A non-transitory computer-readable storage medium encoded with an executable computer program for processing an image and that, when executed by a processor, causes the processor to perform operations comprising:
receiving an omnidirectional image;
receiving, with a processor, an instruction to process the omnidirectional image to generate a rectangular image, in response to user input via a display on the omnidirectional image; and
generating at least two intermediate images showing a dewarping transition between the omnidirectional image and the rectangular image, including generating a second intermediate image having a greater amount of correction for distortion than a first intermediate image.

21. A method for displaying an image, the method comprising:
displaying an omnidirectional image on a display; and
receiving an instruction input on the displayed omnidirectional image, the instruction instructing a processor to generate a rectangular image,
in response to the received instruction, generating at least one two intermediate image images showing a dewarping transition between the omnidirectional image and the rectangular image, including generating a second intermediate image having a greater amount of correction for distortion than a first intermediate image.

22. The method according to claim 1, wherein the at least two intermediate images are stretched in one direction during the dewarping transition.

23. The method according to claim 1, wherein the at least two intermediate images are stretched in two directions during the dewarping transition.

24. The method according to claim 13, further comprising generating two intermediate images showing the dewarping transition between the omnidirectional image and the rectangular image, wherein a second image of the two intermediate images includes a lesser amount of distortion than a first image of the two intermediate images.

25. The method according to claim 24, wherein the at least two intermediate images are stretched in two directions during the dewarping transition.

26. The method for processing an image according to claim 1, further comprising generating a clipped image that represents a first area smaller than an area represented in the omnidirectional image and is superimposed on the omnidirectional image.

27. The method for processing an image according to claim 26, further comprising changing a size of the clipped image superimposed on the omnidirectional image in response to user input.

28. The method for processing an image according to claim 26, wherein an initial display position of the clipped image overlaps an area from which the clipped image was clipped in the omnidirectional image.

29. The method for processing an image according to claim 26, further comprising generating an additional clipped image that represents a second area, different from the first area, smaller than the area represented in the omnidirectional image and is superposed on the clipped image.

30. The method for processing an image according to claim 1, further comprising generating two panoramic images by correcting a distortion of the omnidirectional image.

31. The method for processing an image according to claim 30, wherein a scrolling operation performed on one of the two panoramic images causes scrolling of both of the two panoramic images.

32. The method for processing an image according to claim 30, wherein a first panoramic image of the two panoramic images comprises a half of the omnidirectional image and a second panoramic image of the two panoramic images comprises the other half of the omnidirectional image.

33. The method for processing an image according to claim 13, further comprising generating a clipped image that represents a first area smaller than an area represented in the omnidirectional image and is superimposed on the omnidirectional image.

34. The method for processing an image according to claim 33, further comprising changing a size of the clipped image superimposed on the omnidirectional image in response to user input.

35. The method for processing an image according to claim 33, wherein an initial display position of the clipped image overlaps an area from which the clipped image was clipped in the omnidirectional image.

36. The method for processing an image according to claim 33, further comprising generating an additional clipped image that represents a second area, different from the first area, smaller than the area represented in the omnidirectional image and is superposed on the clipped image.

37. The method for processing an image according to claim 13, further comprising generating two panoramic images by correcting a distortion of the omnidirectional image.

38. The method for processing an image according to claim 37, wherein a scrolling operation performed on one of the two panoramic images causes scrolling of both of the two panoramic images.

39. The method for processing an image according to claim 37, wherein a first panoramic image of the two panoramic images comprises a half of the omnidirectional image and a second panoramic image of the two panoramic images comprises the other half of the omnidirectional image.

* * * * *